US012694128B1

(12) United States Patent
Bourgeois et al.

(10) Patent No.: US 12,694,128 B1
(45) Date of Patent: Jul. 28, 2026

(54) CYBERSECURITY COMPLIANCE ASSESSMENT

(71) Applicant: HeadMind Partners AI, Paris (FR)

(72) Inventors: Guy-Hubert Bourgeois, Saint Marc Jaumegarde (FR); Billal Chouli, Enghien les Bains (FR)

(73) Assignee: HEADMIND PARTNERS AI, Paris (FR)

( * ) Notice: Subject to any disclaimer, the term of this patent is extended or adjusted under 35 U.S.C. 154(b) by 0 days.

(21) Appl. No.: 19/370,573

(22) Filed: Oct. 27, 2025

(51) Int. Cl.
*G06F 21/57* (2013.01)
*H04L 9/40* (2022.01)
*H04L 41/16* (2022.01)

(52) U.S. Cl.
CPC ...... *G06F 21/577* (2013.01); *G06F 2221/034* (2013.01); *H04L 41/16* (2013.01); *H04L 63/1416* (2013.01); *H04L 63/1425* (2013.01); *H04L 63/1433* (2013.01)

(58) Field of Classification Search
CPC . G06F 21/577; G06F 2221/034; H04L 41/16; H04L 63/1416; H04L 63/1425; H04L 63/1433
See application file for complete search history.

(56) References Cited

U.S. PATENT DOCUMENTS 11,321,538 B1 * 5/2022 Fontecilla ............... G06F 40/30
12,505,095 B1 * 12/2025 Rozen ................. G06F 16/2433

2017/0063912 A1 * 3/2017 Muddu .................. G06N 5/022
2024/0422187 A1 * 12/2024 Shah ........................ G06F 40/56
2025/0348664 A1 * 11/2025 Dhindsa ................. G06F 40/20

FOREIGN PATENT DOCUMENTS

WO WO-2025101512 A1 * 5/2025 ............. G06N 20/00

OTHER PUBLICATIONS

"Rethinking Legal Compliance Automation: Opportunities with Large Language Models"—Hassani et al., University of Ottawa, Apr. 22, 2024 https://arxiv.org/pdf/2404.14356 (Year: 2024).*
(Continued)

*Primary Examiner* — Randy A Scott
(74) *Attorney, Agent, or Firm* — Hamilton, Brook, Smith & Reynolds, P.C.

(57) ABSTRACT

The disclosure notably relates to a computer-implemented method for cybersecurity compliance assessment. The method comprises obtaining one or more documents containing a description of an IT infrastructure, or of an organization or project relying on an IT infrastructure and a plurality of requirements, including a set of cybersecurity requirements. The method further comprises selecting, for each requirement, one or more respective chunks each of a respective document. The method further comprises assessing, for each requirement, a level of compliance of the description with the requirement, the assessing being based on the requirement and on the selected one or more respective chunks. The assessing is performed by an assessing module comprising a plurality of LLMs configured to cooperate for computing the level of compliance. The method further comprises generating digital data that represents a result of the assessment. Such a method improves cybersecurity compliance assessment.

17 Claims, 6 Drawing Sheets

(56) References Cited

OTHER PUBLICATIONS

"Securing Large Language Models: Threats, Vulnerabilities, and Responsible Practices"—Abdali et al., Microsoft & University of California, Riverside, Jun. 11, 2025 https://www.microsoft.com/en-us/research/wp-content/uploads/2024/07/2403.12503v2.pdf?msockid=1e2835d1fb766b99334a2292fa6f6a5c (Year: 2025).*

"Open-Orca/OpenOrca Datasets at Hugging Face.", Available online at <https://huggingface.co/datasets/Open-Orca/OpenOrca>, retrieved on Nov. 20, 2025, 11 pages.

Dettmers, T., et al., "Qlora: Efficient Finetuning of Quantized LLMs.", Advances in Neural Information Processing Systems, vol. 36, 2023, pp. 10088-10115.

Du, M., et al., "DeepResearch Bench: A Comprehensive Benchmark for Deep Research Agents.", arXiv preprint arXiv:2506.11763, Jun. 16, 2025, 31 pages.

Erhan, D., et al., "Why Does Unsupervised Pre-Training help Deep Learning?. ", Proceedings of the Thirteenth International Conference on Artificial Intelligence and Statistics, 2010, pp. 201-208.

Guo, Y., et al., "Efficient Continual Pre-Training by Mitigating the Stability Gap.", arXiv preprint arXiv:2406. 14833, Jun. 27, 2024, 28 pages.

Hoffmann, J., et al., "Training Compute-Optimal Large Language Models.", arXiv preprint arXiv:2203.15556, Mar. 29, 2022, 36 pages.

Hu, E. J., et al., "Lora: Low-Rank Adaptation of Large Language Models.", ICLR, vol. 1, No. 2, Oct. 16, 2021, 26 pages.

Ke, Z., et al., "Continual Pre-Training of Language Models.", arXiv preprint arXiv:2302.03241, Apr. 12, 2023, 16 pages.

Liu, H., et al., "Few-shot Parameter-Efficient Fine-Tuning is Better and Cheaper than In-Context Learning.", Advances in Neural Information Processing Systems, vol. 35, Aug. 26, 2022, pp. 1950-1965.

Matena, M. S., et al., "Merging models with Fisher-Weighted Averaging", Advances in Neural Information Processing Systems, vol. 35, Aug. 26, 2022, pp. 17703-17716.

Mohtashami, A., et al., "Cotformer: A Chain-of-Tthought Driven Architecture with Budget-Adaptive Computation Cost at Inference.", arXiv preprint arXiv:2310.10845, Aug. 14, 2024, 14 pages.

Mukherjee, S., et al., "Orca: Progressive Learning from Complex Explanation Traces of GPT-4.", arXiv preprint arXiv:2306.02707, Jun. 5, 2023, 51 pages.

Muralidharan, S., et al., "Compact Language Models via Pruning and Knowledge Distillation.", Advances in Neural Information Processing Systems, vol. 37, Nov. 4, 2024, pp. 41076-41102.

Parmar, J., et al., "Reuse, Don't Retrain: A Recipe for Continued Pretraining of Language Models.", arXiv preprint arXiv:2407. 07263, Jul. 9, 2024, 15 pages.

Rafailov, R., et al., "Direct Preference Optimization: Your Language Model is Secretly a Reward Model.", Advances in Neural Information Processing Systems, vol. 36, Jul. 29, 2024, 27 pages.

Schulman, J., et al., "Proximal policy optimization algorithms.", arXiv preprint, arXiv:1707.06347, Aug. 28, 2017, pp. 1-12.

Shao, Z., et al., "Deepseekmath: Pushing the Limits of Mathematical Reasoning in Open Language Models.", arXiv preprint arXiv:2402. 03300, Apr. 27, 2024, 30 pages.

Singh, S. P., et al., Model Fusion via Optimal Transport., Advances in Neural Information Processing Systems, vol. 33, May 16, 2023, 36 pages.

Sreenivas, S. T., et al., "LLM Pruning and Distillation in Practice: The Minitron Approach.", arXiv preprint arXiv:2408.11796, Dec. 9, 2024, 11 pages.

Su, J., et al., "Roformer: Enhanced transformer with rotary position embedding.", Neurocomputing, vol. 568, Nov. 8, 2023, pp. 1-14.

Sun, K., et al., "Amuro & char: Analyzing the relationship between pre-training and fine-tuning of large language models.", Proceedings of the 10th Workshop on Representation Learning for NLP, May 4, 2025, pp. 131-151.

Tirumala, K., et al., D4 Improving LLM pretraining via document de-duplication and diversification., Advances in Neural Information Processing Systems, vol. 36, 2023, 13 pages.

Vm, K., et al., "Fine Tuning LLM for enterprise: Practical Guidelines and Recommendations.", arXiv preprint arXiv:2404.10779, Mar. 23, 2024, 17 pages.

Wang, Y., et al., "Self-instruct: Aligning Language Models with Self-Generated Instructions.", Proceedings of the 61st annual meeting of the association for computational linguistics, vol. 1: long papers, May 25, 2023, 23 pages.

Xia, Y., et al., "Understanding the Performance and Estimating the Cost of LLM Fine-Tuning.", IEEE International Symposium on Workload Characterization, Aug. 8, 2024, 14 pages.

Xu, C., et al., "WizardLM: Empowering Large Pre-Trained Language Models to Follow Complex Instructions.", The Twelfth International Conference on Learning Representations, May 27, 2025, 22 pages.

Yadav, P., et al., "Ties-merging: Resolving Interference when Merging Models.", Advances in Neural Information Processing Systems, vol. 36, Oct. 27, 2023, 23 pages.

Yu, L., et al., "Language Models are Super Mario: Absorbing Abilities from Homologous Models as a Free Lunch.", Forty-first International Conference on Machine Learning, Jun. 13, 2024, 21 pages.

Zhang, B., et al., "When Scaling Meets LLM Finetuning: The Effect of Data, Model and Finetuning Method.", arXiv preprint arXiv:2402. 17193, Feb. 27, 2024, 20 pages.

Zhu, Q., et al., "When does Further Pre-Training LLM help? An Empirical Study on Task-Oriented Dialog Pre-Rraining.", Proceedings of the Second Workshop on Insights from Negative Results in NLP, 2021, pp. 54-61.

* cited by examiner

CYBERSECURITY COMPLIANCE ASSESSMENT

TECHNICAL FIELD

The disclosure relates to the field of computer programs and systems, and more specifically to a method, system and program for cybersecurity compliance assessment.

BACKGROUND

Cybersecurity refers to the practice of protecting Information Technology (IT) infrastructures comprising, for example, computer systems, storages, networks, and data from unauthorized access, attacks, damage, or disruption. Cyber threats include malware, phishing, ransomware, and other malicious activities, and continue to evolve in sophistication and frequency.

For example, the 2024 Cybercrime Trends Report highlights an acceleration in cyber threats worldwide, increasingly exposing businesses and institutions to financial, ethical, and social risks. According to the 2023 Cyber Threat Panorama by ANSSI, strategic and industrial espionage was the most pressing concern for its teams. However, with the rapid digitization of the battlefield and the expansion of conflicts into the digital sphere, cyber threats now also affect the Defense sector.

Today, large corporations and public organizations, such as the Ministry of Defense, have become prime targets for malicious actors exploiting all possible vulnerabilities-including information systems, employees, and subcontractors. For example, France has experienced a 400% increase in cyberattacks since 2020, with 69% targeting businesses, 20% local authorities, and 11% healthcare institutions. ANSSI has also noted a significant rise in attacks against entities operating in strategic fields, such as think tanks, research institutes, and the defense industrial and technological base (BITD), as well as organizations handling sensitive data, such as telecommunications and digital service providers (ESN). The list of cyberattack methods continues to grow, including phishing, hacking, ransomware attacks, "vishing," denial-of-service (DDoS) attacks, and identity/DNS spoofing.

The professionalization of cybercrime and cyber-espionage, driven by advances in AI and cutting-edge technologies, along with growing geopolitical tensions, is pushing organizations to strengthen their cybersecurity measures.

Chief information security officers (CISO) are the experts responsible for the security of the information systems and the confidentiality of the data in an organization. To make sure any project meets security, legal and operational requirements before deployment, the CISO team goes through a process of compliance assessment, formally approving and certifying that the projects are in agreement with the company policies, the industry standards and other legal regulations. However, compliance assessment can be a very slow process. Usually, it is not carried out with the required rigor and attention to details, and it is often abandoned.

Within this context, there is still a need for an improved solution for cybersecurity compliance assessment.

SUMMARY

It is therefore provided a computer-implemented method for cybersecurity compliance assessment. The method comprises obtaining one or more documents containing a description of an IT infrastructure, or of an organization or project relying on an IT infrastructure. The method further comprises obtaining a plurality of requirements, including a set of cybersecurity requirements, each requirement including a text.

The method further comprises determining, for each document, one or more respective document vectors. Each respective document vector is a numerical vector representing a chunk of the document. Thereby, the method comprises obtaining a plurality of document vectors each representing a respective chunk of a respective document. The method further comprises determining, for each requirement, a respective requirement vector. The respective requirement vector is a numerical vector representing the text of the requirement.

The method further comprises selecting, for each requirement, one or more respective chunks each of a respective document. The selecting is based on a relevance with respect to the respective requirement vector.

The method further comprises assessing, for each requirement, a level of compliance of the description with the requirement. The assessing is based on the requirement and on the selected one or more respective chunks. The assessing is performed by an assessing module. The assessing module comprises a plurality of LLMs configured to cooperate for computing the level of compliance.

The method further comprises generating digital data that represents a result of the assessment.

The method may optionally comprise any one or any combination of the following features:

- the determining of each respective document vector comprises:
  - determining a respective text representation of the respective chunk; and
  - vectorizing the respective text representation;
- at least one chunk of at least one document contains at least one piece of non-textual data, and determining a respective text representation of the respective chunk comprises converting each piece of non-textual data of each chunk into a piece of textual data and including the piece of textual data in the respective text representation of the respective chunk, the converting comprising providing as input each piece of non-textual data to a converting module including a respective LLM; and/or
- vectorizing the respective text representation of the respective chunk comprises providing as input the respective text representation of the respective chunk to an embedding module; and determining, for each requirement, a respective requirement vector, comprises providing as input the text of the requirement to the embedding module;
- the text of each requirement contains one or more sentences, the respective text representation of each chunk contains one or more sentences, the embedding module comprising a first embedding sub-module and a second embedding sub-module, and the embedding module is configured for taking a respective text containing one or more respective sentences as input and for:
  - by the first embedding sub-module, taking each respective sentence as input and determining an embedding vector representing the respective sentence, thereby obtaining a set of one or more embedding vectors, and
  - by the second embedding sub-module, taking the set of one or more embedding vectors as input and combining the set of one or more embedding vectors into a single vector representing the respective text pro-
vided as input to the embedding module;
the first embedding sub-module comprises a trained
embedding model with a transformer-based architec-
ture, the trained embedding model having been trained
on a training dataset comprising entries, each entry
comprising a cybersecurity text;
the selecting of the one or more respective chunks com-
prises, for each requirement:
computing a similarity score between each document
vector and the respective requirement vector;
identifying a number of documents vectors having a
smallest distance with the respective requirement
vector; and
determining among the chunks corresponding to the
identified number of document vectors the one or
more respective chunks having a highest relevance
with respect to the requirement;
the determining among the chunks corresponding to the
identified number of document vectors the one or more
respective chunks is performed with a respective LLM,
the respective LLM having been fine-tuned using
cybersecurity text;
the assessing module is configured for performing one or
more executions of a block including:
a first LLM which provides as output a respective level
of compliance among a set of values including "fully
compliant", "partially compliant", and "non-compli-
ant", and
a second LLM configured to be executed when, and
only when, the first LLM provides as output "par-
tially compliant", the second LLM being configured
to refine the respective level of compliance;
the level of compliance of the description with the
requirement provided by the assessing module being
based on the respective level of compliance outputted
by each execution of the block;
either one of:
the assessing module is configured for further execut-
ing, after each respective execution of the block a
third LLM, the third LLM being configured for
taking as input the requirement, the selected one or
more respective chunks, and the respective level of
compliance outputted by the respective execution of
the block, and providing as output a respective score
of confidence indicating an exactness of the respec-
tive level of compliance outputted by the respective
execution of the block; the assessing module is
configured for sequentially iterating executions of
the block and of the third LLM until the respective
score of confidence is higher than a predetermined
threshold; and the level of compliance of the descrip-
tion with the requirement provided by the assessing
module is based on the respective level of compli-
ance outputted by a last execution of the block; or
the assessing module is configured for performing
several executions of the block independently and in
parallel; and the level of compliance of the descrip-
tion with the requirement provided by the assessing
module is a most common level of compliance
among the respective level of compliance outputted
by each execution of the block;
the digital data comprises a document data file;
the method further comprises establishing a justification
of the result of the assessment with a respective LLM;
the digital data comprises, for at least one requirement, an
instruction to increase the level of compliance;

establishing the instruction to increase the level of com-
pliance with a respective LLM;
the IT infrastructure is a real-world IT infrastructure, and
the digital data comprise, for at least one requirement,
configuration data to be deployed in the IT infrastruc-
ture to increase the level of compliance;
the digital data comprises a graphical representation of the
result, the method further comprises displaying the
graphical representation on a display; and/or
the method further comprises creating a data management
component comprising at least:
a requirement dataset comprising entries, each entry
being indexed by a requirement, and comprising the
text of the requirement;
a description dataset comprising entries, each entry
being indexed by a chunk of one of the documents,
and comprising the determined text representation of
the chunk; and
a vector dataset comprising requirement entries and
description entries, each requirement entry compris-
ing:
a pointer to an entry of the requirement dataset; and
a respective requirement vector having been deter-
mined from the requirement indexing the pointed
entry;
each description entry comprising:
a pointer to an entry of the description dataset; and
a respective description vector having been deter-
mined from the description indexing the pointed
entry.
It is further provided a computer program comprising
instructions for performing the method.
It is further provided a computer readable storage medium
having recorded thereon the computer program.
It is further provided a system comprising a processor
coupled to a memory (and optionally to a graphical user
interface), the memory having recorded thereon the com-
puter program.

BRIEF DESCRIPTION OF THE DRAWINGS

Non-limiting examples will now be described in reference
to the accompanying drawings, where.

DETAILED DESCRIPTION

Figure 1:
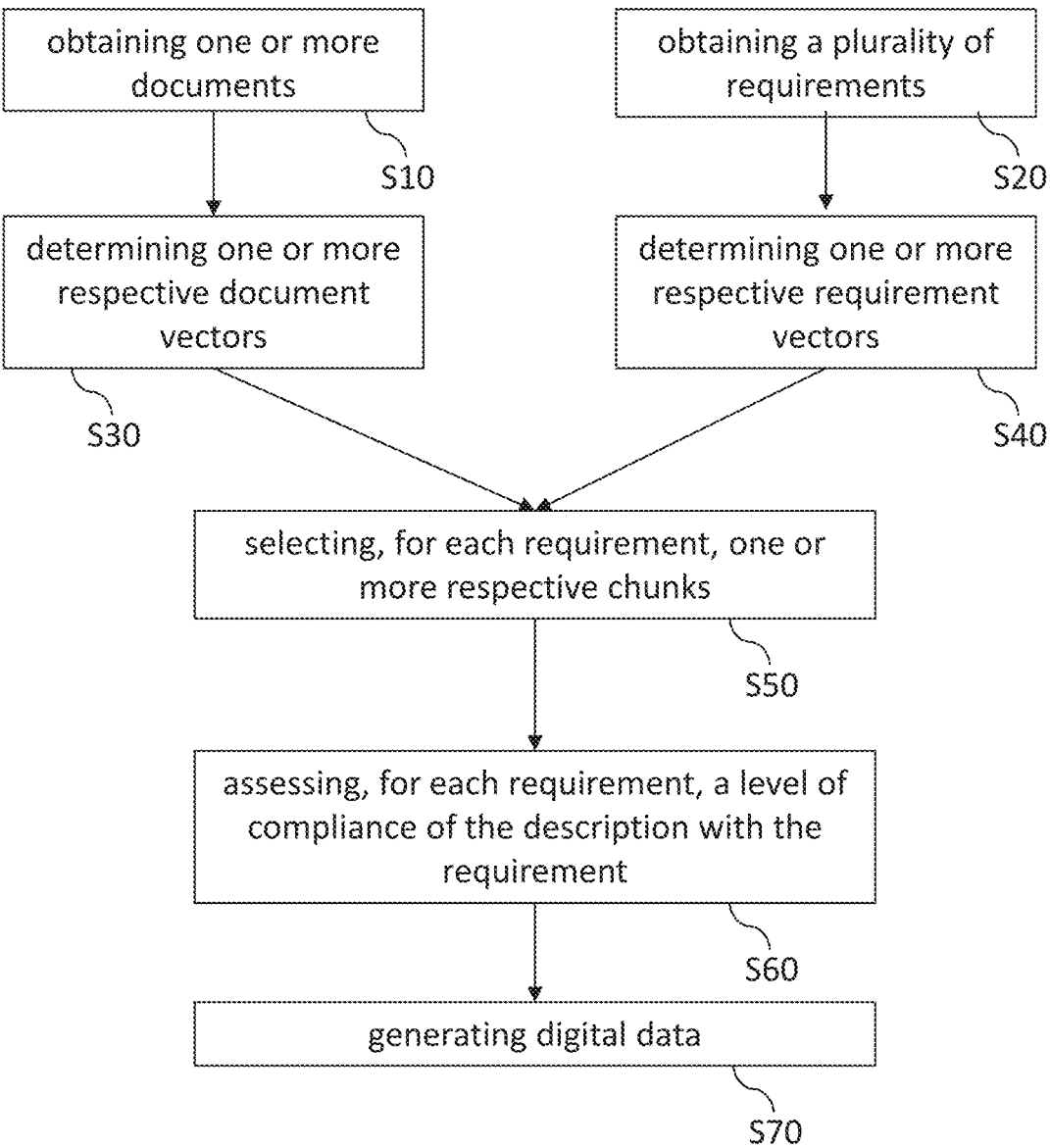
FIGS. 1-5 show flowcharts of examples of implementa-
tions of the method.

A description of example embodiments follows.
With reference to the flowchart of FIG. 1, it is proposed
a computer-implemented method for cybersecurity compli-
ance assessment. The method comprises obtaining S10 one
or more documents containing a description of an IT infra-
structure, or of an organization or project relying on an IT
infrastructure. The method further comprises obtaining S20
a plurality of requirements, including a set of cybersecurity
requirements, each requirement including a text. The
method further comprises determining S30, for each docu-
ment, one or more respective document vectors. Each
respective document vector is a numerical vector representing a chunk of the document. Thereby, the method comprises obtaining a plurality of document vectors each representing a respective chunk of a respective document. The method further comprises determining S40, for each requirement, a respective requirement vector. The respective requirement vector is a numerical vector representing the text of the requirement.

The method further comprises selecting S50, for each requirement, one or more respective chunks each of a respective document. The selecting is based on a relevance with respect to the respective requirement vector. The method further comprises assessing S60, for each requirement, a level of compliance of the description with the requirement. The assessing is based on the requirement and on the selected one or more respective chunks. The assessing is performed by an assessing module. The assessing module comprises a plurality of LLMs configured to cooperate for computing the level of compliance.

The method further comprises generating S70 digital data that represents a result of the assessment.

Such a method improves cybersecurity compliance assessment by enabling faster, rigorous, complete, and more reliable assessments. Indeed, the method may operate within a timeframe ranging from a few seconds to a few minutes, whereas prior art methods involved prolonged effort by (human) experts.

Additionally, the method automatically assesses the compliance of each of the requirements, and each of the assessments is executed with a same level of rigor and precision. On the contrary, compliance assessments obtained according to prior art methods are often incomplete, carried out by different experts each working with a different level of rigor and precision, and sometimes abandoned before being complete.

Furthermore, the method automatically generates digital data (at S70) representing the result of the assessment. Such digital data may comprise complete assessment reports highlighting a level of compliance for each requirement. On the contrary, in prior art methods, the assessment reports are often incomplete and not sufficiently described, making them hard to understand by third parties.

Specifically, the method may comprise, by a group of experts, such as a chief information security officers (CISO) team, identifying the plurality of requirements (e.g., at S20) and the one or more documents containing the description of the IT infrastructure, or of the organization or project relying on the IT infrastructure (e.g., at S10). The plurality of requirements may comprise hundreds of requirements referencing to a multitude of legal, administrative, and/or common use requirements. The documents may have different formats, be prepared by different authors, and/or comprise textual and non-textual elements. Moreover, several different passages of a same document or of different documents may be pertinent for a single requirement.

Thus, manually assessing (as it is done in prior art methods) the compliance of each of the requirement is an extremely laborious process, that is prone to errors. Moreover, manually writing compliance-type reports, such as Physical and Environmental Security (PES), requires to draft summaries of the documents and reports of the compliance process. In some cases, multiple compliance-type reports are required, comprising specific reports, e.g., country-dependent reports, that may vary in form and format. For example, in France, a specific structured templated is used for cybersecurity risk assessment, called FEROS ("Fiche d'Expression Rationnelle des Objectifs de Sécurité", in French, meaning "Security Objectives Rational Expression Worksheet"). Overall, prior to the present invention, many organizations gave up executing a complete compliance assessment, as these procedures extended over time and did not end on schedule.

However, as stated in the background, ensuring that an IT infrastructure is compliant to the most up-to-date cybersecurity standards is of great importance, e.g., to safeguard sensitive information, and maintain the trustworthiness of digital ecosystems.

The method automates such processes and thus contributes to the above-mentioned goals. For example, the method may be fully automatically executed by one or more computing systems. The method may comprise, for example, (e.g., by the experts) obtaining S10 the one or more documents and S20 the plurality of requirements, and then, fully automatically executing the steps S30-S70, thereby providing as output the compliance assessment. The method may thus comprise fully automatically assessing (e.g., through S30-S60) the compliance without any other user intervention. Alternatively, the method may further include optional user-system interactions (e.g., through an interface, as explained hereinbelow), for example to initiate, modify, or validate one or more steps of the method. For example, the user may update, or modify one or more thresholds, change the architecture of one or more LLMs, generate reports with different formats, and/or generate instructions for increasing the compliance level.

Therefore, a user using the method may obtain a result of the assessment (e.g., a compliance assessment) within few seconds to a few minutes after S10 and S20 without any other interaction, or with minimal interaction, depending on the user's need. Moreover, the method may automatically generate at S70 reports (e.g., the digital data may comprise one or more reports), following the expected templates and formats, without any intervention of the experts. Thus, the method can greatly reduce the time required for generating such reports.

The method may be implemented on a computer system, such as a local computing device, a remote server, or a distributed architecture comprising multiple interconnected nodes. For example, the method may comprise, by the user, interacting with an (e.g., graphical) interface running on a local computer, and executing one or more steps (e.g., any number of steps among S10 to S70) on a remote server connect (e.g., via internet) to the local computer. Alternatively, the method may be implemented entirely on a local system.

The method comprises generating S70 digital data and such digital data may be outputted to the user. The digital data represents a result of the assessment executed at S60. The digital data may comprise a document data file. The method may further comprise, e.g., automatically, storing the document data file in a non-volatile memory (on a local system, or on a cloud) upon generation or validation by a user. Additionally or alternatively, the method may comprise, e.g., automatically, displaying (e.g., on a display) the document data file to the user. Additionally or alternatively, the method may comprise, e.g., automatically, printing the document data file. The document data file may be, e.g., in pdf format, tabular format, text format, or in any other format. The document data file may comprise one or more reports, a result of the assessment, a summary, and/or at least one instruction to increase the level of compliance.

The document data file may comply to one or more (e.g., legal or administrative) regulations. That is, the document data file may be directly usable by the user without further modification. For example, the user may directly file the document data file to an administrative and/or public office and/or to a company.

Additionally or alternatively, the generated digital data may comprise a graphical representation of the result. The graphical representation may be in purely text format or comprise one or more graphical elements. The graphical elements may comprise, e.g., graphs showing an overview of the statistics of the compliance level of the requirements (e.g., the number and/or percentage of fully compliant and/or non-compliant requirements). The method may further comprise displaying the graphical representation on a display (e.g., a screen, such as a monitor of a computer, or a screen of a phone or tablet, a projection with a video projection, or the like). For example, the method may comprise, e.g., automatically after S60, displaying the results on the display. The graphical representation may comprise a graphical representation of a document data file.

The method may comprise displaying, e.g., on a display, a graphical interface to the user. The graphical representation of the results and/or the document data file may thus be displayed within the graphical interface (e.g., in an appositely designed window). The method may further comprise, by the user, interacting with the interface to choose a format for a document data (e.g., different document data files). The interacting may be with a haptic device, such as a mouse, a keyboard, and/or a touchscreen. The interacting may result in the generation, storage, printing, and/or the displaying of a document data file or of a result of the assessment.

The user may interact with the interface to add at least one requirement and/or to add and/or modify at least one document. The method may, thus, be repeated several times, each time obtaining new one or more documents (at S10) and/or a new plurality of requirements (at S20). For example, the user may add a missing document and execute a second time the method.

The document data file and/or the graphical representation may comprise a tabular data file. The tabular data file may comprise one or more rows. Each of the one or more rows may be indexed by a requirement (e.g., there may be a 1-to-1 correspondence between the requirements and the rows). The tabular data file may comprise one or more columns. Each of such columns may comprise:

a title and/or an ID of the requirement indexed by the row;

the text included in the requirement indexed by the row;

a level of compliance (e.g., assessed at S60) of the requirement indexed by the row, the level of compliance optionally being one among "fully compliant", "partially compliant", "partially non-compliant", and "non-compliant";

a justification of the assessment of the level of compliance; and/or a reference (such as a page, a paragraph, a section) in a document among the one or more documents comprising at least part of a chunk referring to the requirement indexed by the row.

The generating S70 of the digital data may comprise the use of an LLM. That is, the generating S70 may comprise providing as input a prompt to the LLM. The prompt may comprise the result of the assessment (obtained at S60), at least one (e.g., each) requirement (obtained at S10), and/or at least one (e.g., each) chunk (obtained at S20). The prompt may further comprise a description of the wanted output, e.g., a format of the wanted document data file and/or graphical representation. For example, the generating S70 may comprise generating, by an LLM, a short summary of the assessment.

For example, the method may comprise establishing a justification/explanation of the result of the assessment with a respective LLM. Thus, the method may comprise providing as input a prompt to the respective LLM. The prompt may comprise at least one requirement, at least one document, and an assessed level of compliance. Additionally or alternatively, the method may comprise obtaining as output the justification/explanation of the result of the assessment directly from the assessing module. For example, a first LLM and/or a second LLM that may be comprised in the assessing module may be configured to output an assessment of a level of compliance and a justification/explanation of such assessment. Thus, the generating S70 may comprise using such justifications/explanations (e.g., formatting these justifications/explanations in a single file, or provide them as input to an LLM to obtain a summary/report). For example, the document data file and/or the graphical representation may comprise justifications/explanations outputted directly by the assessing module (e.g., by the first LLM and/or the second LLM).

Moreover, the digital data generated at S70 may comprise, for a subset of (e.g., cybersecurity) requirements (comprised in the plurality of requirements), an instruction to increase the level of compliance of at least one (e.g., each) requirement of the subset. The instruction may be included in a document data file, displayed to the user via a display, and/or printed. The instructions may be written in human-readable language, comprising one or more steps that a user may follow to increase said level of compliance. The instructions may, optionally, include a graphical guidance (e.g., a flowchart), e.g., illustrating the one or more steps. The instructions may, optionally, include code, such as a script and/or a patch. For example, the method may assess at S60 that the level of compliance of each requirement of the subset is not the highest, e.g., the one or more documents may not be "fully compliant" with each requirement of the subset. For example, the method may output at S70 that one or more requirements of the subset are not sufficiently addressed in (i.e., by the IT infrastructure according to) the one or more documents (e.g., not addressed at all). Additionally or alternatively, the method may output at S70 that the one or more documents (at least partially) contradict one or more requirements of the subset.

The assessment of the subset of (e.g., cybersecurity) requirements may thus indicate that at least one document is missing from the one or more documents. For example, a documentation about a software or a physical component of the IT infrastructure may be missing. Thus, the instructions may comprise information about missing documents and, optionally, steps to obtain such documents. The method may then comprise, by a user such as an expert, obtaining at least one additional document (e.g., using said steps). The method may subsequently be executed a second time, wherein, during this second execution, the one or more documents include the previously obtained at least one additional document. The level of compliance may thereby be increased.

Additionally or alternatively, the assessment of the subset of (e.g., cybersecurity) requirements may indicate an actual non-conformal element (e.g., a security flaw) in the IT infrastructure. That is, the subset of (e.g., cybersecurity) requirements may indicate a necessity to avoid and/or prevent an actual non-conformal element (e.g., a security flow) in the IT infrastructure. The method may thereby assess the security flaws of the IT infrastructure. The instruction may comprise procedural steps to resolve non-conformal elements in accordance with the requirement, thereby enabling execution of cybersecurity corrective measures. The non-conformal elements may comprise security flaws, as for example, the access of a critical file may be too broad, and/or a critical software may not be at its latest version or may comprise a known vulnerability. The method may then comprise, by a user such as an expert, following the instruction to solve the non-conformal elements, such as the security flaw. Thus, the method may increase the cybersecurity of the IT infrastructure.

For example, the IT infrastructure may be a real-world IT infrastructure. Such a real-world IT infrastructure may be, e.g., at least in part, physical (e.g., comprising computers, mobile devices, servers, and the like). The digital data may comprise, for at least one requirement, configuration data (e.g., as part of the instructions) to be deployed in the IT infrastructure to increase the level of compliance. The configuration data may include steps relating to physical adjustments to be implemented in the IT infrastructure. Physical adjustments may comprise, as non-limiting example, directly connecting (e.g., with a cable) or disconnecting two systems, moving critical IT components in a secured room, replacing old components, removing or blocking webcams, and/or adding security components. It is understood that these are just typical examples of physical adjustments that may be executed by experts for resolving non-conformal elements, and that each concrete case may require a variety of actions specific to the given case.

The real-world IT infrastructure may be at least in part virtual (e.g., comprising software, operating systems, cloud services, and the like). The digital data may comprise, for at least one requirement, configuration data (e.g., as part of the instructions) to be deployed in the IT infrastructure to increase the level of compliance. The configuration data may include steps relating to virtual adjustments to be implemented in the IT infrastructure. Virtual adjustments may comprise, as non-limiting example, changing access to a file, updating a software, enabling logging on a software, fixing a known vulnerability, replacing or upgrading an antivirus and/or a firewall, and/or updating a firmware. It is understood that these are just typical examples of virtual adjustments that may be executed by experts for resolving non-conformal elements, and that each concrete case may require a variety of actions specific to the given case.

The method may comprise, e.g., automatically by the system, establishing/generating/preparing the instruction to increase the level of compliance (e.g., comprising procedural steps to resolve non-conformal elements in accordance with the requirement) with a respective LLM. The respective LLM may take as input a prompt comprising a result of the assessment (e.g., generated at S70, assessed at S60). The prompt may further comprise a description of the expected instructions. For example, the description may include a mention that the instructions should comprise procedural steps to resolve non-conformal elements in accordance with the requirement. The description may further comprise that the instructions should be in human-readable language and abide to a predetermined format. The description may also include a mention that a security expert should be able to easily follow such procedural steps. The description may comprise an indication of which scripts and/or patches may be executed and/or implemented by a security expert to increase the level of compliance. For example, the description may comprise an indication of a possible code language and/or available libraries for the scripts and/or patches.

Optionally, the method may also comprise (e.g., automatically) solving an assessed security flaw. That is, the method may automatically follow one or more steps to solve the assessed security flaw (e.g., upon user confirmation, e.g., on the graphical interface). For example, the generating S70 may comprise generating a script and/or a patch to solve the security flaw. The generating of the script and/or the patch may, e.g., be requested by a user (e.g., with an interactable element in the graphical interface). The method may then comprise (e.g., automatically by the system or through user-system interactions) executing said script and/or applying said patch to solve said security flaw. For example, the method may comprise, e.g., within a graphical interface, displaying to the user a script and/or patch, along with a description of said script and/or patch. The method may further comprise displaying an interactable element (e.g., on the graphical interface) asking whether the user wants to automatically implement said script and/or patch. That is, the method may further comprise, by the user, interacting with the interactable element and, by the system, executing said script and/or applying said patch to solve the security flaw. The generating of the script and/or patch may comprise the use of an LLM. For example, the method may comprise providing as input to the LLM a prompt comprising the requirement, the instruction, and indication of the current system (e.g., a version of a software, access file, or the actual code describing a software) and obtaining as output the script and/or patch.

The method may subsequently be executed a multitude of times. After each execution, the expert may implement corrective measures to the IT infrastructure and/or provide additional documents. Thereby, the method improves the cybersecurity of the IT infrastructure.

The method leverages the capabilities of multiple large language models (LLMs), comprising the plurality of LLMs of the assessing module, to assess the compliance and, optionally, to generate at S70 reports, to determine textual representations of chunks, and/or to select at S50 the one or more respective chunks. Each of the LLMs is a language model capable of understanding and producing human readable text. At least one (e.g., each) of the LLMs may be trained using self-supervised machine learning techniques on vast quantities of textual data, enabling it to perform a range of natural language processing tasks. Additionally or alternatively, at least one (e.g., each) of the LLMs may be trained using distillation or imitation training, a training method consisting of learning from a previously trained (e.g., with self-supervised learning) LLM. At least one (e.g., each) of the LLMs may further be fine-tuned, with, e.g., supervised learning or reinforcement learning. The architecture of the large language model may vary and include, for example, transformer-based models such as GPT, BERT, LLAMA, Phi, Mistral, Claude, Gemini, or other models employing similar or derivative mechanisms for language modeling. In the implementation described hereinbelow, the architectures Phi, especially Phi 3.5 and Phi 4, and LLaMA, especially LLAMA 3.1 8B, were used.

Each of the LLMs is capable of interpreting any human-readable description (in any of the languages known by the LLM), without the need to adhere to predefined structured syntax. Moreover, at least one (e.g., each) of the LLMs may be capable of processing images, tables, graphs, and other non-text elements. However, using LLMs also faces significant challenges. For example, a method (not covered by the present disclosure) that would consist in providing as input all the requirements and all of the documents to an LLM in order to obtain a compliance assessment, would provide as output an incomplete compliance assessment comprising several hallucinations and mistakes.

A challenge is that the LLMs have a context (i.e., a size of input that can be correctly processed) and a size of output that are too small to fully process the documents, the requirements, and expect a compliance assessment for each of them. Moreover, keeping the context and the output relatively small increases the reliability of the LLMs, minimizing the risks of hallucinations. Therefore, the method proceeds with the assessing at S60 requirement by requirement. Additionally, for each requirement, the method only uses at S60 a portion (consisting of one or more chunks) of the documents, the portion being selected at S50, and consisting of the most pertinent portions for the assessment. Thereby, the method minimizes the amount of information processed by each of the LLM, ensuring a reliable output.

Another challenge is that LLMs have the tendency to hallucinate (i.e., produce erroneous or inconsistent content), be biased, or not to properly explain the reasons for their output. Therefore, the assessing module comprises a plurality of LLMs configured to cooperate. Indeed, the probability that each of the LLM of the plurality commits a same error is extremely low. Moreover, at least one (e.g., each) LLM of the plurality may include a prompt designed to contextualize the task and ensuring a correct output. Furthermore, the assessing module may comprise LLMs having different architectures and/or different roles. In the implementations described hereinbelow, such strategies showed an increase in the reliability of the method.

Another challenge is that the LLMs underperform in contexts where a specific technical language is used (such as in the context of compliance assessment, especially in cybersecurity setting). Additional challenges come if the technical language is not in English (e.g., in French). Therefore, the method comprises the determining S30 and S40 of document vectors and of requirement vectors. The document and requirement vectors may encode the essential features necessary for determining the most pertinent portions of each document for each requirement. For example, the determining S30 and S40 may use an embedding model that is fine-tuned with the specific technical language (e.g., cybersecurity compliance assessment), e.g., in a non-English language, such as French. The embedding model may enable an efficient comparison between requirements and chunks (e.g., in the selecting S50), reducing the number of error and ensuring that all the pertinent chunks are detected. Moreover, the method may include (e.g., in the selecting S50) using fine-tuned (e.g., superficially fine-tuned, and/or LoRA) LLMs specifically trained to understand the context of compliance assessment, especially in cybersecurity setting.

By a "prompt" it is meant any text that is provided as input to an LLM. Each of the LLM in the present disclosure may be "prompted". Such a prompted LLM has a predetermined text (i.e., a prompt) included in its specifications, and the predetermined text influences the output of the LLM. For example, the predetermined text may be automatically included in each input text given to the LLM. For example, an LLM may be prompted to receive as input two texts (e.g., a requirement and a portion—such as one or more chunks— of the one or more documents) and provide as output a single word within a list, e.g., "compliant" or "not compliant", indicating whether the portion of the document is or not compliant with the requirement. Crafting a precise prompt may increase the performance of an LLM for a given task.

The term "Information Technology (IT) infrastructure" refers to hardware, software, network resources, and/or services required for the existence, operation, and management of an IT environment. The IT infrastructure may include (e.g., consist of) physical components such as computers, mobile devices, systems, haptic devices, cables, screens, routers, servers, storage devices, and/or networking equipment. The IT infrastructure may include (e.g., consist of) virtual resources such as cloud platforms, databases, virtualization tools, firewalls, antiviruses, firmware, and more generally any software and operating system that can be run on a machine and contributes to the IT infrastructure.

The term "organization" refers to both private and public entities, which may have a physical or exclusively virtual existence. For example, the organization may be a bank, a research institute, a governmental ministry, an equipment manufacturer, or a hospital. The organization relies on an IT infrastructure, meaning that it utilizes the infrastructure for its functioning. For example, the organization may depend on data storage and transmission, software execution, and other operations commonly known in the art.

The term "project" refers to both ongoing and upcoming initiatives. A project may be, for example, a research project, a construction project, a software development project, or any project that relies on an IT infrastructure to achieve defined objectives.

The IT infrastructure, or the organization or project relying on the IT infrastructure, are described by one or more documents. Each of the one or more documents (obtained at S10) is a (e.g., digital) record that describes, specifies, or supports the functioning of the IT infrastructure, or of the organization or the project that relies on said infrastructure. The one or more documents may include, for example, Technical Architecture Document (TAD), operation manuals, Information System Descriptions, Risk Analysis, technical specifications, configuration manuals, project plans, and/or organizational policies. At least one (e.g., each) of the documents may comprise flowcharts, tables, lists, and/or images. At least one (e.g., each) of the documents may be purely text-based. At least one (e.g., each) of the documents may be in a pdf format. The one or more documents may have been prepared by experts (e.g., a different expert for each document).

Referring back to FIG. 1, the method comprises obtaining S10 one or more documents and obtaining S20 a plurality of requirements.

The obtaining S10 of the one or more documents may comprise retrieving (e.g., from local or remote memory) or receiving (e.g., from a remote system) at least one (e.g., each) of the one or more documents. The obtaining S10 may further comprise, by one or more experts, collecting and/or preparing at least one (e.g., each) of the one or more documents. The obtaining S10 may comprise displaying a user interface (e.g., a graphical user interface). The obtaining S10 may further comprise, by a user, using the user interface to upload at least one (e.g., each) of the one or more documents (e.g., on a system or server implementing the method).

Each requirement of the plurality of requirement obtained at S20 is a technical and procedural criteria that the IT infrastructure or the organization or project relying on the IT infrastructure must meet to ensure a correct functioning and minimize the occurrence of errors. The plurality of requirements includes a set of cybersecurity requirements. Each of the cybersecurity requirement is a technical and procedural criterion necessary to ensure adequate protection against cyber threats. Cybersecurity requirements may comprise access controls, encryption standards, authentication mechanisms, incident response protocols, and regular security assessments.

In examples, at least one (e.g., each) of the requirements may be comprised in a security standard, such as ISO 27001, IG 1300, IM 900, or PSSI A, in a legal regulation, such as GDPR, or DORA, and/or in an internal policy, such as access control. Compliance with such requirements is often mandated by industry regulations, organizational policies, or risk management strategies. The plurality of requirements may thus comprise hundreds of requirements, e.g., comprised in any one of the above. Meeting each of the requirements, and especially the cybersecurity requirements, is important for preventing data breaches and maintaining operational continuity.

The obtaining S20 of the plurality of requirements may comprise retrieving (e.g., from local or remote memory) or receiving (e.g., from a remote system) at least one (e.g., each) of the plurality of requirements. The obtaining S20 may further comprise, by one or more experts, determining the necessary requirements. The obtaining S20 may comprise displaying a user interface (e.g., a graphical user interface). The graphical user interface may be the same (e.g., on a different window) than the one that may be used at the obtaining S10. The obtaining S20 may further comprise, by a user, using the user interface to upload at least one (e.g., each) of the plurality of requirements (e.g., on a system or server implementing the method). Additionally or alternatively, the user interface may already comprise a predefined set of requirements, and the obtaining S20 may comprise, by the user, selecting at least one (e.g., each) of the plurality of requirement from the user interface.

The method further comprises determining S30, for each document, one or more respective document vectors, each respective document vector being a numerical vector (e.g., consisting of integers, such as positive integers) representing a chunk of the document, thereby obtaining a plurality of document vectors each representing a respective chunk of a respective document.

Each "chunk" of the document is a portion of the document, and each document is partitioned in a plurality of (e.g., non-overlapping) chunks. The determining S30 may comprise determining each chunk of each of the one or more documents. For example, the determining S30 may comprise partitioning each document into chunks. Each chunk may consist of a section, of a page, of a predetermined number of paragraphs of a respective document. The chunks may also have variable size. For example, each chunk may consist of a page and additionally consist of a portion of a next page, e.g., if the page separates a single paragraph into two parts. Each chunk of the document may be logically consistent and address a single subject. For example, each document may address several subjects, and each chunk may consist of one of said several subjects.

Each document vector represents a respective chunk of the document. That is, each document vector may be a vectorized (e.g., encoded, embedded) version of the respective chunk. Such vectorized versions may be easier to compare to respective vectorized requirements (instead of to the requirement themselves), thereby increasing the efficacy of the method.

Figure 2:
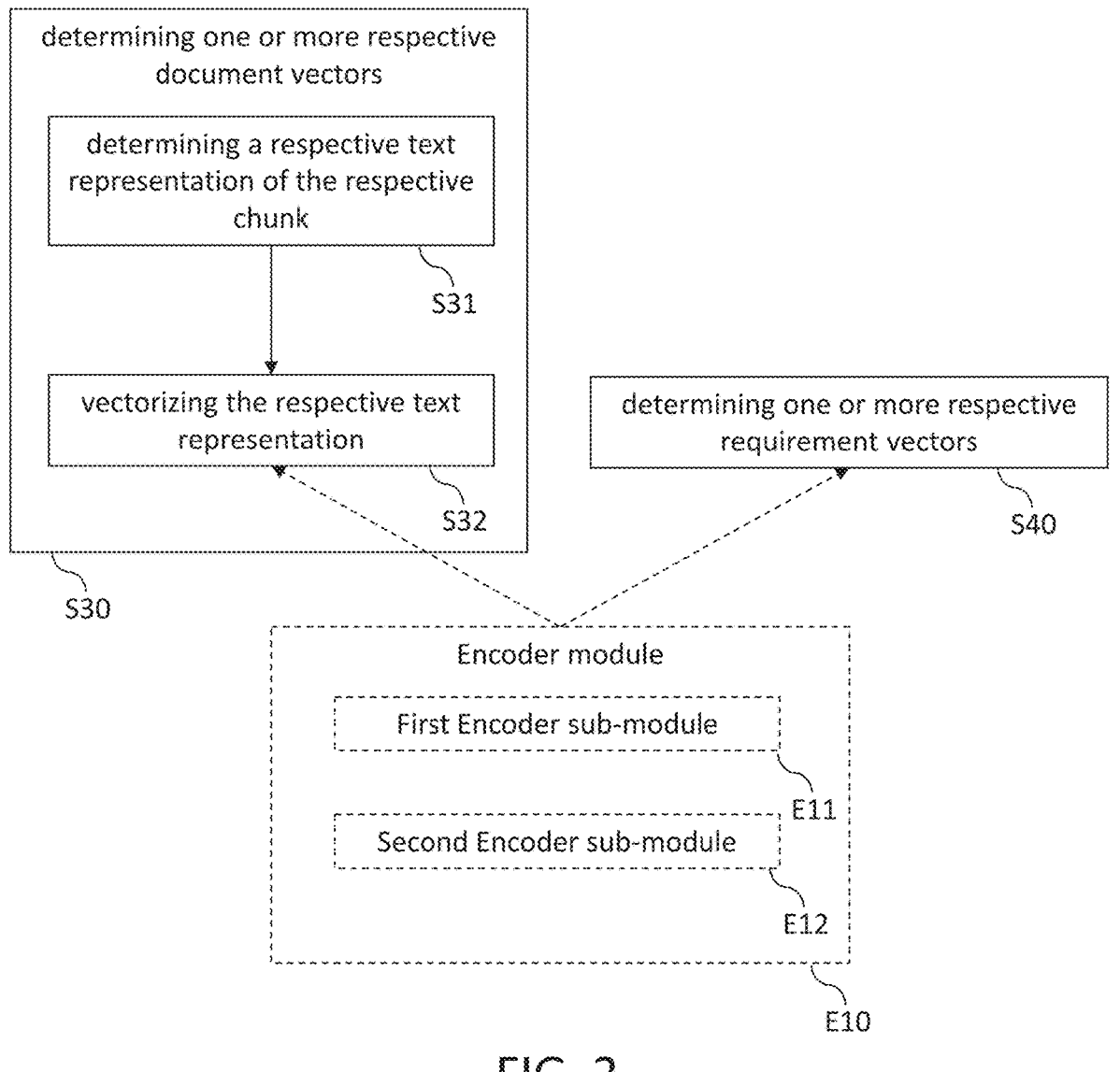
Figure 3:
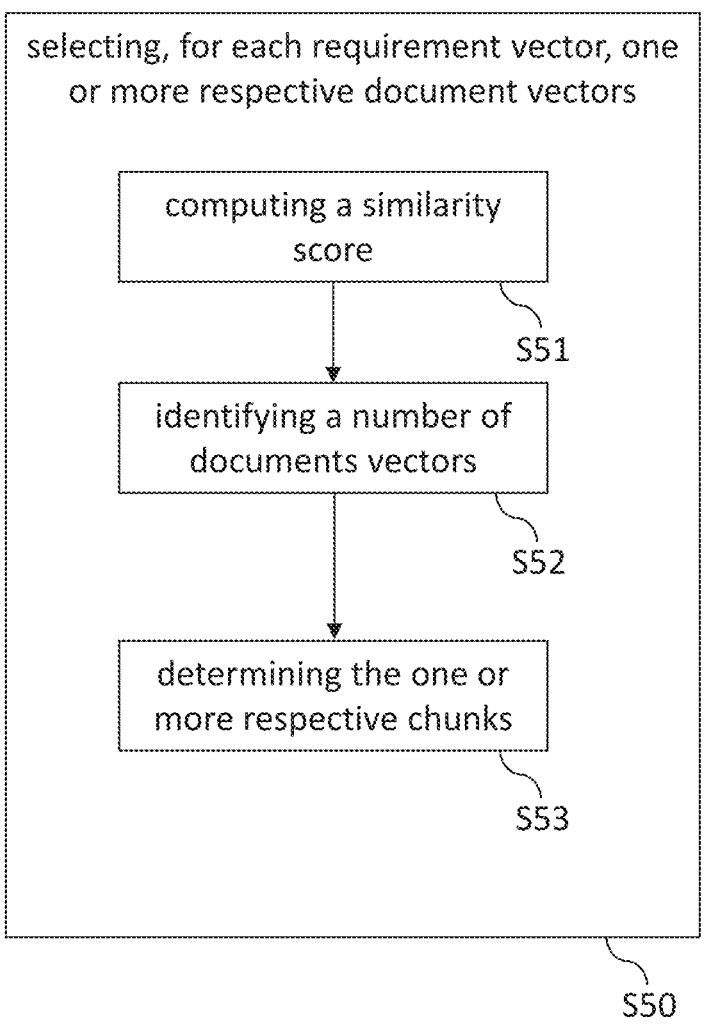

With reference to FIG. 2, the determining S30 may further comprise determining S31 a respective text representation of the respective chunk. The text representation may be human-readable, comprise each text-element of the respective chunk, and a complete description of each non-textual element. For example, at least one chunk of at least one document may contain at least one piece of non-textual data, and the determining of the respective text representation of the respective chunk may comprise converting each piece of non-textual data of each chunk into a piece of textual data. The determining of the respective text representation of the respective chunk may further comprise including the piece of textual data in the respective text representation of the respective chunk.

For example, the non-textual data of the at least one chunk of at least one document may be a table, a graph, a flowchart, or a picture. Such non-textual data may also be an audio file or a video. The converting comprises determining a description of the non-textual data.

The converting may comprise providing as input each piece of non-textual data to a converting module. The converting module may include a respective LLM (that may be prompted, or have a different prompt depending on the input). The converting module may be configured to receive as input non-textual data and provide as output a textual description of the non-textual data. For example, a chunk of a document may comprise a table. The converting module may comprise a program that determines a text representation of the table (examples of such programs are known in the literature). The converting module may further comprise providing as input a prompt to the respective LLM. The prompt may comprise the text representation of the table. The prompt may further comprise instructions stating that the LLM receives as input a table converted to text. The instructions may further state that the expect output is a description of said table. In another example, a chunk of a document may comprise a figure such as an image or a graph. The converting module may comprise an Optical Character Recognition (OCR) program to detect whether any text is present in the figure, and if so, to extract said text. The converting module may further comprise providing as input the figure and optionally any detected/extracted text to the respective LLM. The respective LLM may be prompted, e.g., stating that the text received as input is comprised in the image and that the expected output is a description of said image and its text. The LLM may also automatically comprise an OCR module and automatically perform the character recognition on the image.

The determining S30 may further comprise vectorizing S32 the respective text representation, i.e., converting the respective text representation of a respective chunk into the respective document vector. That is, each of the document vectors may be determined from the text representation of the chunks and not from the chunks themselves. This may be beneficial, as the vectorization may not be able to process images or tables.

The method further comprises determining S40, for each requirement, a respective requirement vector (e.g., consisting of integers, such as positive integers), the respective requirement vector being a numerical vector representing the text of the requirement.

Each requirement vector represents a respective requirement. That is, each requirement vector may be a vectorized (e.g., encoded, embedded) version of the respective requirement. Such vectorized versions may be easier to compare to respective vectorized chunks (instead of to the chunks themselves), thereby increasing the efficacy of the method.

The vectorizing S32 of the respective text representation of the respective chunk may comprise providing as input the respective text representation of the respective chunk to an embedding module E10. Similarly, the determining S30, for each requirement, a respective requirement vector, may comprise providing as input the text of the requirement to the embedding module E10. It is noted that a same embedding module E10 may be used for both the determining S30 of each respective document vectors and the determining

S40 of each respective requirement vector. Using a same embedding module E10 (for both S30 and S40) may be beneficial, as it may be easier to compare requirement vectors and document vectors encoded with a same embedding module. The embedding module E10 may be configured for receiving as input a text, e.g., comprising one or more sentences, and providing as output a numerical vector (e.g., made of integers, such as non-negative integers). The output of the embedding module E10 may all have a same dimension (e.g., 1024, or similar dimensions). That is, the dimension of the vector may not depend on the size of the input. Thus, all the document vectors and the requirement vectors may have a same dimension.

In examples, the text of each requirement may contain (e.g., be comprised of) one or more parts. For example, the one or more parts may consist of a single part consisting of the entire text. Alternatively, each of the one or more parts may be a paragraph, a sentence, or a word of the text. Similarly, the respective text representation of each chunk may contain (e.g., be comprised of) one or more parts, each of the one or more parts being, as discussed before, the entire text, a paragraph, a sentence, or a word of the text. The embedding module E10 may comprise a first embedding sub-module E11. The embedding module E10 may be configured for taking a respective text containing one or more respective parts as input. The embedding module E10 may further be configured for providing as input each respective part to the first embedding sub-module E11. The first embedding sub-module E11 may determine an embedding vector representing the respective part. Thereby, the first embedding sub-module E11 may provide as output a set of one or more embedding vectors, one for each part of the text provided (e.g., a requirement or a chunk) as input to the embedding module E10.

Therefore, if the part consists of the entire text, the embedding sub-module E11 is called/executed only once. On the other opposite, if each part consists of a single word, the embedding sub-module E11 is executed a multitude of times. Executing the sub-module on smaller parts of a text (e.g., a requirement or a chunk) may increase the accuracy of the method by obtaining a bigger set of embedding vectors for each text (e.g., requirement or chunk). The bigger set of embedding vectors may enable a better determination at S30 and S40 of respective document vectors and respective requirement vectors, the vectors being better able to encode the content of the chunks and requirements. However, each execution of the sub-module E11 may require non-negligible computational resources. For example, as discussed below, the sub-module E11 may comprise one or more embedding models (e.g., one or two), such as transformers. Thus, it may be computationally too expensive to consider as parts the single words. In the implementation described hereinbelow, the compromise which gave the highest efficiency and reliability was when each of the parts is a sentence.

All the embedding vectors may be numerical vectors (e.g., consisting of integers, such as positive integers) and may have a same dimension. For example, the embedding sub-module E11 may comprise one or more trained embedding models with transformer-based architectures. For example, each of the one or more trained embedding models may be a transformer (e.g., based on a Solon model). Each of the one or more trained embedding models may utilize a self-attention mechanism to encode textual input into high-dimensional vector representations. Each of the one or more trained embedding models may have been trained (e.g., fine-tuned) on a training dataset comprising entries, each entry comprising a cybersecurity text. The entries may all be in a same language, such as English or French. Alternatively, the entries may be in different languages allowing the one or more embedding model to properly embed in the different languages (e.g., the documents may be in different languages). Thus, each of the one or more embedding models may have been trained using a contrastive loss. The training dataset may comprise a plurality of cybersecurity requirements and a plurality of cybersecurity documents. The method may comprise generating the training dataset and/or training the embedding model.

Thereby, each of the one or more trained embedding models may be able to correctly map different texts related to a same cybersecurity concept (such as a requirement) to vectors that are close in the embedding space. By "close" it is meant with respect to a distance (any known distance, such as Euclidean or L^p-distance) and/or a similarity score (such as a scalar product, a dot product, an angle, a cosine-similarity).

In an example, at least one of the embedding model may be based on the model XLM-ROBERTa-E5. Such an embedding model may be capable of correctly understanding and encoding in a multitude of languages. The embedding model may be further fine-tuned in a non-English language (e.g., French). For example, at least one (e.g., each) of the entries of the training dataset may be in French.

The embedding module E10 may further comprise a model (e.g., a sparse model, such as a TF-IDF model) able to capture the syntax resemblance between the requirement (associated with the requirement vector) and each of the chunks. The result of such a model may be combined with the output of the embedding sub-module E11 to improve the score.

The embedding module E10 may further comprise a second embedding sub-module E12. The second embedding sub-module E12 may be configured for taking as input the set of one or more embedding vectors provided as output by the embedding sub-module E11. The second embedding sub-module E12 may be configured for combining the set of one or more embedding vectors into a single vector representing the respective text provided as input to the embedding module E10. Thereby, the embedding module E10 may be configured for taking as input a text (e.g., a requirement or a chunk) and to provide as output a single embedding vector. For example, the second embedding sub-module E12 may compute a mean, or a barycenter of the set of one or more embedding vectors obtained as input.

Altogether, the embedding module E10 may be able to embed chunks discussing and/or analyzing a requirement closer (e.g., with respect to a distance or a similarity score) to the embedded requirement than other (e.g., not discussed) embedded requirements.

The method may further comprise creating a data management component (e.g., a database, such as an SQLite database). The data management component may comprise the plurality of requirements, each text representation of each respective chunk, each requirement vector, and each document vector. The data management component may enable an efficient retrieval of the texts, of the documents and their respective embedded versions, increasing the efficacy of the method.

The data management component may comprise a requirement dataset. The requirement dataset may comprise a plurality of entries. Each entry may be indexed by a requirement, may comprise an ID of reference to the requirement, a title of the requirement, and/or the text of the requirement.

The data management component may comprise a description dataset. The requirement dataset may comprise a multitude of entries. Each entry may be indexed by a chunk of one of the documents, and may comprise the text representation of the chunk. The entry may further comprise a reference to the documents comprising the chunk, such as the name of the document, a section and/or a page within the document comprising at least part of the chunk. Thus, the description dataset may enable, at S70, to easily add the necessary references to the user.

The data management component may further comprise a vector dataset. The vector dataset may comprise requirement entries and description entries. Each requirement entry may comprise a pointer to a respective entry of the requirement dataset. Each requirement entry may further comprise a respective requirement vector having been determined at S40 (e.g., with the embedding module E10) from the requirement indexing the pointed entry of the requirement dataset. Each description entry may comprise a pointer to an entry of the description dataset. Each description entry may further comprise a pointer a respective description vector having been determined from the description indexing the pointed entry of the description dataset.

Thus, the data management component may enable a fast and interchangeable use of requirements and of the respective requirement vectors. Analogously, the data management component may enable a fast and interchangeable use of chunks and of the respective document vectors, keeping track of the original location of each chunk within the one or more documents.

The method may further comprise storing the created data management component on a non-volatile memory. For example, the method may be executed a plurality of time, each execution updating the data management component without recreating it from scratch. Thus, the speed of execution of the determining S30 and S40 of a second or further execution of the method may be drastically increased, by using the result of such steps, stored in the data management component, of previous executions of the method.

Referring back to FIG. 1, the method comprises selecting S50, for each requirement, one or more respective chunks each of a respective document. The selecting is based on a relevance with respect to the respective requirement vector. The one or more respective chunks may be the chunks that are most relevant with respect to the requirement. For example, the one or more respective chunks (e.g., collectively, or each one taken singularly) may discuss and/or analyze the requirement. For example, the requirement may ask that the IT infrastructure should log and keep trace of every security event, and each one of the chunks may analyze different logging mechanism.

The selecting S50 may comprise, for each requirement, computing S51 a similarity score between each document vector and the respective requirement vector. The similarity score may be any vector similarity score, such as any vector similarity score (commonly known), for example a sum of a dense similarity score and a sparse similarity score, depending on the context (e.g., dense or sparse model). The similarity score may be (e.g., a sum of) a Euclidean distance, a scalar product (such as a dot product), or a cosine similarity (measuring an angle between the vectors).

The selecting S50 may further comprise identifying S52 a number (e.g., between 5 and 30, such as 20 or 25) of document vectors having a highest similarity score with the respective requirement vector. That is, each document vector of the identified number of document vectors may have a similarity score (with the respective requirement vector) that is higher or equal than the similarity score (with the respective requirement vector) of each document vector (determined at S30) that are not comprised in the identified number of document vectors. For example, the selecting S50 may comprise ordering the document vectors with respect to the similarity scored (with the respective requirement vector) computed at S51 and the identifying S52 may identify the first (i.e., top) number of document vectors.

In an example, the document vector and the respective requirement vector are both obtained with the same embedding module E10 comprising at least a trained embedding model (e.g., a transformer). As already discussed, the embedding module E10 may be able to embed chunks discussing and/or analyzing a requirement closer to the embedded requirements than other (e.g., not discussed) embedded requirements. Thus, the identified number of document vectors may represent the most relevant chunks for the requirement.

Each of the document vectors identified at S52 corresponds to a chunk. Indeed, each document vector is determined at S30 from a corresponding chunk. The selecting S50 may further comprise determining S53 among the chunks corresponding to the identified (at S52) number of document vectors the one or more respective chunks (e.g., 5 chunks) having a highest relevance with respect to the requirement. The selected (at S50) one or more respective chunks may be the determined (at S53) one or more respective chunks. The selecting S50 of the one or more respective chunks in multiple steps may be beneficial, as steps S51 and S52 may be computationally fast, whereas S53 may require more computational resources. Thus, the more computationally requiring S53 may only be applied on the identified (at S52) document vectors (and the corresponding chunks).

The determining S53 among the chunks corresponding to the identified number of document vectors of the one or more respective chunks may be performed with a respective LLM. That is, the one or more respective chunks may be directly determined by an LLM (e.g., provided as output by the LLM) or indirectly (e.g., obtained with a ranking provided by the LLM).

For example, the determining S53 may comprise providing as input a prompt to the respective LLM. The prompt may comprise the requirement and each of the chunks corresponding to the identified (at S52) number of document vectors simultaneously. The prompt may further comprise instructions asking the LLM to select the most pertinent chunks with respect to the requirement. The (selected at S50 and/or determined at S53) one or more respective chunks may be the chunks selected by the LLM.

In another example, the determining S53 may comprise providing as input a plurality of prompts to the respective LLM. The plurality of prompts may all be provided as input to the same instance of the LLM (e.g., so that the LLM maintains a memory of the previously provided prompts) or be provided to different instances of the LLM (e.g., to reset the memory after each call). Each of the plurality of prompts may comprise a single chunk of the chunks corresponding to the identified (at S52) number of document vectors simultaneously. Each of the prompt may comprise instructions asking the LLM to provide a level of pertinence of the chunk with the requirement. The level of pertinence may be a number. For example the number may be between 0 and 20 increasingly indicating the pertinence, e.g., 0 indicating that the chunk is not pertinent at all, 20 that the chunk is very pertinent.

In such example, the (selected at S50 and/or determined at S53) one or more respective chunks may be all the chunks with level of pertinence higher than a predetermined threshold, or a predetermined number of chunks having the highest level of pertinence.

Alternatively, in such example, the determining S53 may further comprise one or more reparametrizing steps, such as dynamic threshold filtering to identify clusters of chunks based on the scored assigned to them, and adapting the threshold to the clusters. Such a dynamic threshold filtering may, for example, use Kernel Density Estimator (KDE).

The respective LLM may have been fine-tuned using cybersecurity text. Fine-tuning refers to the process of adapting a trained LLM to a specific domain (e.g., cybersecurity) by further training it on a training dataset (e.g., comprising cybersecurity text, documents, and requirements). Such a training dataset may be much smaller than a training dataset necessary for training an LLM from scratch. This post-training procedure may enable the LLM to specialize and improve accuracy for cybersecurity and the specific language used in the assessment. Fine-tuning typically requires backpropagation through at least part of the model. For example, the respective LLM may have been superficially fine-tuned. Superficial fine-tuning denotes a form of lightweight adaptation wherein only the most visible layers are modified without altering the core weights. For example, the respective LLM may have been superficially fine-tuned using Low-Rank Adaptation (LoRA). LoRA refers to a method that introduces additional trainable layers while keeping the original weights unchanged. LoRA may be efficient, as only a few new layers are trained to better perform in the specific (e.g., cybersecurity) context.

The method may also comprise generating a training dataset (e.g., comprising cybersecurity texts, requirements, and/or documents). The method may also comprise fine-tuning, such as superficially fine-tuning and/or LoRA, a pre-trained LLM, thereby obtaining the respective LLM.

In the implementation discussed hereinbelow, it was observed that using a (superficially, such as LoRA) fine-tuned LLM drastically increases the performances of the selecting S50. Indeed, the respective LLM may have to process a large number of chunks (e.g., 20 or 30) and select a small number (e.g., 5) of chunks. This small number of chunks are the chunks used for the assessment analysis at S60. A fine-tuned LLM may able to better determine, among a plurality of chunks that have a similar embedding (e.g., according to the embedding module E10), which chunks are the most relevant for the assessment of the requirement.

Referring back to FIG. 1, the method comprises assessing S60, for each requirement, a level of compliance of the description with the requirement. The assessing is based on the requirement and on the selected (at S50) one or more respective chunks (selected starting from the requirement). That is, the assessing S60 may be executed independently and iteratively (e.g., sequentially or in parallel) for each requirement of the plurality of requirements. For example, for each requirement, the selecting S60 may comprise retrieving (e.g., from the data management component) the requirement and the selected (at S50) one or more respective chunks.

Figure 4:
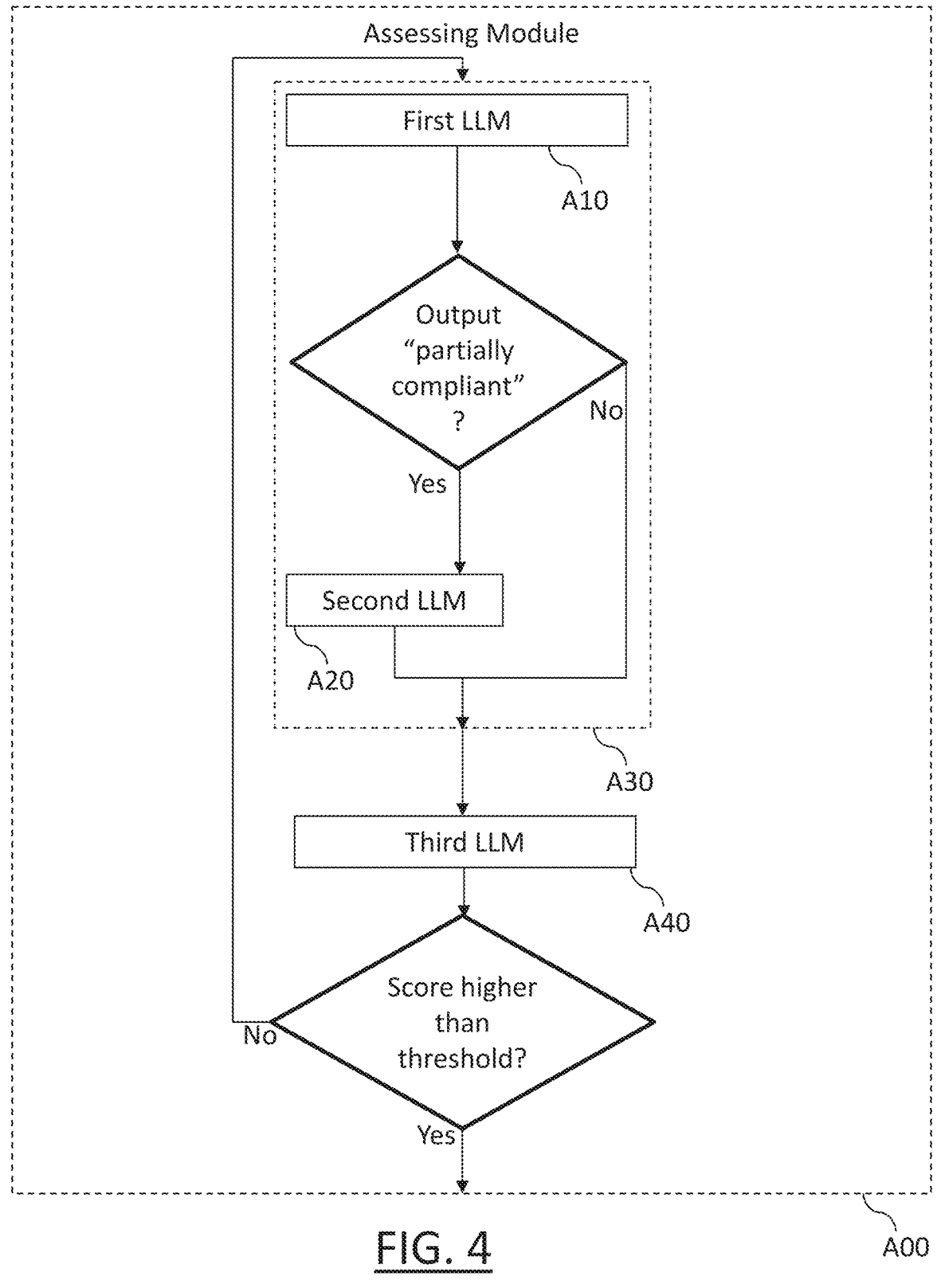
Figure 5:
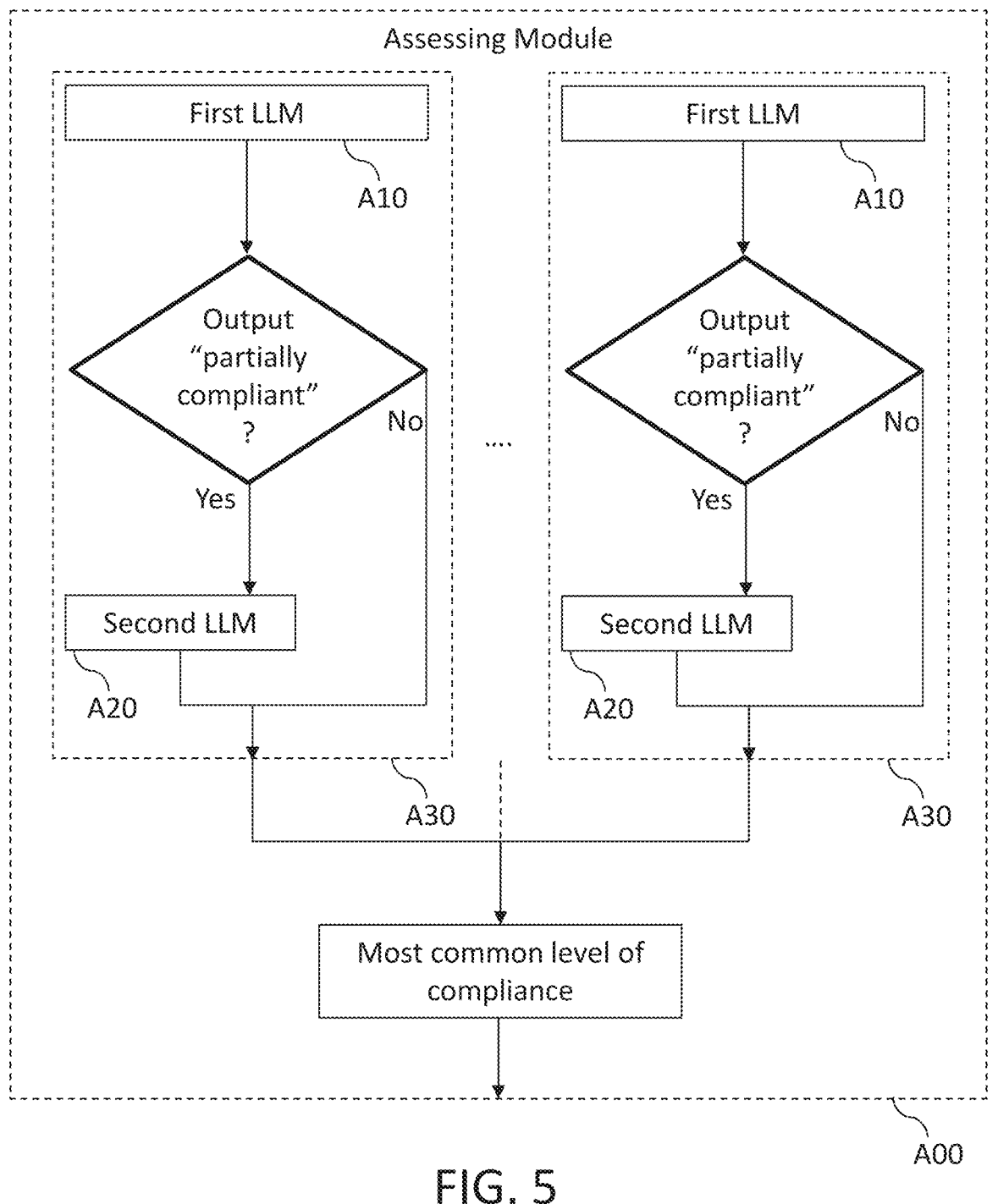

With reference to FIGS. 4 and 5, the assessing is performed by an assessing module A00. The assessing S60 may thus comprise, for each requirement, providing as input the requirement and the selected one or more respective chunks to the assessing module A00. The assessing module A00 comprises a plurality of LLMs configured to cooperate for computing the level of compliance. The assessing module may be configured to provide as output a level of compliance of the requirement. For example, the level of compliance may comprise (e.g., be one of) "fully compliant", "partially compliant", "partially non-compliant", or "non-compliant". The respective level of compliance may further include "inapplicable". The assessing module A00 may further be configured to output a justification/explanation of the level of compliance. For example, the justification/explanation may comprise information on why the level of compliance is "partially compliant" but not "fully compliant" (e.g., which part of the requirement are satisfied and which are not).

Remarkably, as the assessing module A00 comprises a plurality of LLMs, the probability that the output comprises hallucinations, or a wrong level of compliance, is drastically reduced (compared to, e.g., using a single LLM). Indeed, the probability that each of the plurality of LLMs commits a same error is extremely low. Moreover, each of the plurality of LLMs may have a specific prompt, clarifying and delimiting the task of the LLM, further increasing the reliability of the assessing module A00.

By "configured to cooperate" it is therefore meant that the executions and the outputs of the LLMs are conjointly used for assessing the compliance level. For example, the result of at least one LLM may be used as input (e.g., in a prompt) of at least one other LLM. For example, an LLM may be used to verify the result of one or more LLMs. Additionally or alternatively, a multitude of LLMs may be executed independently with a same prompt and the level of compliance may be a most common level of compliance, or a most reliable level of compliance.

The assessing module A00 may be configured for performing one or more executions of a block A30. The block A30 may be configured for taking as input a requirement and one or more chunks and provide as output a level of compliance (e.g., "fully compliant", "partially compliant", "partially non-compliant", or "non-compliant") of the one or more chunks with the requirement. The method may comprise, in each execution of the block A30, providing as input the requirement (provided as input to the assessing module A00) and the one or more respective chunks obtained at S50 (starting from the requirement) to the block A30. The block A30 may further be configured to provide as output a justification/explanation of the level of compliance.

The one or more executions of the block A30 may be sequential (e.g., each waiting for the result of the previous execution) or in parallel (e.g., the executions being independent from one another). The level of compliance of the description with the requirement provided by the assessing module A00 may be based on the respective level of compliance outputted by each execution (or a last execution) of the block A30. The block A30 may comprise at least one LLM of the plurality of LLMs configured to cooperate for computing the level of compliance.

The block A30 may comprise a first LLM A10 (comprised in the plurality of LLMs). The first LLM A10 may be configured to (e.g., prompted to) provide as output a respective level of compliance among a set of values including "fully compliant", "partially compliant", and "non-compliant". The respective level of compliance may further include "inapplicable".

In an example, the first LLM A10 may be configured to take as input a same input as block A30, that is a requirement and one or more chunks. Thus, the method may comprise, in each executions of block A30, providing as input the requirement (provided as input to the assessing module A00) and the selected one or more respective chunks obtained at S50 (starting from the requirement) to the first LLM A10. The first LLM A10 may be configured to (e.g., prompted to)

provide as output a respective level of compliance of the requirement with respect to the (e.g., selected) one or more (e.g. respective) chunks.

Alternatively, the block A30 may be configured to perform a plurality of calls to the first LLM A10. For example, each of the executions of block A30 may comprise iteratively providing as input the requirement and one of the selected (at S50) one or more respective chunks to the first LLM A10, the iteration being with respect to the selected one or more respective chunks. The first LLM A10 may keep its memory in the iteration, e.g., a unique instance of the first LLM A10 may be used for the entire iteratively providing. The first LLM A10 may be configured to (e.g., prompted to) provide as output a respective level of compliance of the requirement with respect to the (e.g., selected) one or more (e.g. respective) chunks.

The first LLM A10 may be prompted. The prompt may comprise instructions instructing the first LLM A10 that it receives as input a requirement and one or more chunks of documents and that it has to provide as output a respective level of compliance among a set of values including "fully compliant", "partially compliant", and "non-compliant". The respective level of compliance may further include "inapplicable". The prompt may further comprise instructions specifying when to use each of the outputs.

For example, the instructions may comprise any number of the following instructions, instructing the first LLM A10 to:

provide as output "fully compliant" if all essential aspects of the requirement are satisfied by the provided prompts, the chunks provide clear proof of the conformity, and none of the essential elements is missing;

provide as output "non-compliant" if the requirement is clearly not respected or no pertinent information regarding the requirement is present in the provided chunks;

provide as output "partially compliant" if only some aspects of the requirement are respected in the chunks, whereas others are not, the chunks do not provide clear and complete proof of the conformity, or additional information are required for the assessment; and/or provide as output "inapplicable" if the requirement does not apply in the context of the chunks, the requirement is not well-defined, or if no judgment is possible as the requirement is not applicable.

The instructions may further comprise that the first LLM A10 should provide as output a justification/explanation of the level of compliance, as previously discussed.

The instructions may further comprise that, if the output is not "fully compliant", e.g., if it is "non-compliant" or "partially compliant", the first LLM A10 should provide as output procedural steps to resolve non-conformal elements in accordance with the requirement, thereby enabling execution of cybersecurity corrective measures, as previously discussed.

The block A30 may further comprise a second LLM A20 (comprised in the plurality of LLMs). The block A30 may be configured to call the second LLM A20 when, and only when, the first LLM A10 provides as output "partially compliant". That is, the second LLM A20 may be configured to be executed when, and only when, the first LLM A10 provides as output "partially compliant". The second LLM A20 may be configured to refine the respective level of compliance. For example, the output may be "partially compliant" or "partially non-compliant".

In examples, the second LLM A20 may be configured to take as input a same input as block A30, that is a requirement and one or more chunks. Thus, the method may comprise, in each executions of block A30, providing as input the requirement (provided as input to the assessing module A00) and the selected one or more respective chunks obtained at S50 (starting from the requirement) to the second LLM A20 whenever the second LLM A20 is called, e.g., whenever the first LLM A10 provides as output "partially compliant". The second LLM A20 may be configured to (e.g., prompted to) provide as output a respective level of compliance of the requirement with respect to the (e.g., selected) one or more (e.g. respective) chunks.

In other examples, as for first LLM A10, the block A30 may be configured to perform a plurality of iterative calls to the second LLM A20, iterating over the selected one or more respective chunks.

The second LLM A20 may be prompted. The prompt may comprise instructions instructing the second LLM A20 that it receives as input a requirement and one or more chunks of documents and that it has to provide as output a respective level of compliance among a set of values including "partially compliant" or "partially non-compliant". The prompt may further comprise instructions specifying when to use each of the outputs. For example, the instructions may comprise any number of the following instructions, instructing the second LLM A20 to:

provide as output "partially compliant" if the essential aspects of the requirement are satisfied, even if some non-essential aspects are not; and/or provide as output "partially non-compliant" if some essential aspects are not respected or missing.

The instructions may further comprise that the second LLM A20 should privilege one of the two replies (e.g., "partially compliant") in case of reasonable doubt.

The instructions may further comprise that the second LLM A20 should provide as output a justification/explanation of the level of compliance and/or procedural steps to resolve non-conformal elements in accordance with the requirement, as previously discussed.

A multitude of possible examples of the assessing module A00 are possible and were implemented. Two examples are hereinbelow described, a first with reference to FIG. 4, and a second with reference to FIG. 5.

With reference to FIG. 4, the assessing module A00 may configured to further execute, after each respective execution of the block A30 a third LLM A40. The third LLM A40 may be configured to (e.g., prompted to) take as input a requirement, one or more respective chunks, and a result of the block A30. The assessing S60 may comprise, after each execution of the block A30 within the assessing module A00, providing as input the requirement (provided as input to the assessing module A00), the one or more respective chunks obtained at S50 (starting from the requirement), and the result of the execution of the block A30 (e.g., a level of compliance and, optionally, a justification/explanation of the assessment level) to the third LLM A40.

The third LLM A40 may configured to (e.g., prompted to) provide as output a respective score of confidence indicating an exactness of the respective level of compliance outputted by the respective execution of the block A30. The respective score of confidence may indicate a level of confidence of the third LLM A40 with respect to the assessment outputted by the block A30. The level of confidence may be a number (e.g., a real number, an integer), such as a number between 0 and 10, increasingly indicating the confidence. For example, 0 may indicate that the level of compliance and/or the justification/explanation of the assessment is not at credibly or well assessed, whereas 10 may indicate that the level of compliance fully corresponds to the provided texts.

The third LLM A40 may be prompted. The prompt may comprise instructions regarding the level of confidence, its format (e.g., numeric between 0 and 10) and how to determine said level of confidence.

Such a third LLM A40 may thus verify that the result of the block A30 (and hence of the first LLM A10 and/or of the second LLM A20) is not hallucinatory and is based on the actual texts (i.e., the requirement and the selected one or more respective chunks). Such an LLM may be referred to as "LLM-as-a-Judge" and, as shown in the implementations, greatly increases the effectiveness of the method. Additionally, the third LLM A40 may have the same architecture as the one of the first and second LLM (A10, A20) or a different architecture. Using a different architecture may further reduce the probability that a hallucinatory output by the block A30 passes undetected. For instance, the architecture may be adapted for such a use.

The assessing module A00 may further be configured for sequentially iterating executions of the block A30 and of the third LLM A40 until the respective score of confidence is higher than a predetermined threshold (e.g., 5 or 7, if the score of confidence is between 0 and 10)

The level of compliance (outputted by the assessing module A00) of the description with the requirement provided by the assessing module A00 may be based on the respective level of compliance outputted by a last execution of the block.

The assessing module A00 may, for example, be configured to iteratively execute the block A30 and the third LLM A40, until the level of confidence outputted by the third LLM A40 is greater than a predetermined threshold (e.g., 5 or 7). Additionally, the assessing module A00 may be configured for executing the block A30 a number of times that is inferior or equal to a predetermined maximal number (e.g., 3, or 5). For example, if such a predetermined maximal number of executions of the block A30 is reached, the assessing module A00 may be configured to output the level of compliance obtained with an execution of the block A30 having a highest score of confidence (obtained with the third LLM A40). In another example, the assessing module A00 may be configured to output a predetermined level of compliance (e.g., "non-compliant" or "inapplicable") if such a maximum is reached.

Therefore, in the example depicted in FIG. 4, the assessing module A00 may be configured for, given a requirement and the selected (at S50) one or more respective chunks (starting from the requirement), iteratively executing first the block A30 and then the third LLM A40. Each execution of the block A30 may comprise providing as input the requirement and the selected (at S50) one or more respective chunks and obtaining as output a level of compliance and, optionally, a justification/explanation of the assessment level. Such an output may be then used by the third LLM A40 to generate a score of confidence, indicating the exactness of the level of compliance. The iteration may halt as soon as the score of confidence is higher than a threshold (or a maximum number of executions is reached). The level of compliance of such a last execution may be the result of the assessment S60.

With reference to FIG. 5, the assessing module A00 may be configured for performing several executions (e.g., 5, or 7) of the block A30 independently and in parallel. Each of the executions of the block A30 may use, as input, the same input as the assessing module A00, namely the requirement and the selected (at S50) one or more respective chunks.

Each of the executions of the block A30 may provide as output a level of compliance (of the requirement) and, optionally justifications/explanations of the level of compliance, as previously discussed. Thus, the method may comprise obtaining a multitude of different "opinions" before assessing the level of compliance.

The level of compliance of the description with the requirement provided by the assessing module A00 is a most common level of compliance among the respective level of compliance outputted by each execution of the block A30. Thus, the result of the assessment S60 may be such most common level of compliance. Notably, the number of the several executions may be defined in a way that a tie of the possible level of compliances is never possible (e.g., the number may be a prime number such as 5, or 7).

An example of a use of the method is now discussed.

In the example, the organization is an institution (e.g., a hospital, a factory, a research institute), situated in one or more physical buildings. The IT infrastructure comprises the physical components (e.g., computers, servers, cables, physical network configurations, and the like). The IT infrastructure additionally comprises virtual components (e.g., operative systems, software, firmware, firewalls, antiviruses, and the like).

In the example, a team of experts obtains (at S10) the one or more documents. The obtaining S10 comprises obtaining manuals and descriptions of at least part of the physical infrastructure. The obtaining S10 further comprises collecting information about access on files, software versions, and logging information. The team of experts prepares the one or more documents, including said information, and including several tables storing said information.

In the example, the team of experts obtains (at S20) the plurality of requirements. The obtaining S20 comprises determining which are the mandatory requirements (e.g., according to the law of a country) that are necessary. The obtaining S20 further comprises determining, by the team of experts, additional requirements in relation to the specific needs of the infrastructure.

In the example, the team of experts uses a graphical interface to upload the obtained one or more documents and the plurality of requirements. Upon the uploading, the system automatically performs the determining S30 and S40, that is, the documents are automatically partitioned in chunks, converted to text, and then converted to numerical vectors (the document vectors). Similarly, the requirements are automatically converted to numerical vectors (the requirement vectors). The requirements, documents, chunks, and the numerical vectors are stored in a SQL database.

In the example, the team of experts verify that all the documents and requirements are uploaded. The team of experts optionally configures one or more configuration settings. For example, a number of wanted chunks per requirement to be selected at S50 may be entered. Additionally or alternatively, an architecture for the LLMs may be chosen.

In the example, the system automatically performs at S50, selecting for each requirement, through the use of a similarity score between the requirement vector and the multitude of document vectors, and the further use of an LLM, one or more chunks. Then, the system automatically performs at S60, the assessment of each of the requirement based on the selected one or more chunks. The assessment is executed with the assessing module A00, according to FIG. 4 or 5.

In the example, the system generates at S70 a tabular representation comprising information of the level of compliance of each of the requirements. The team of experts may then, through interaction with the graphical interface, ask for instructions for improving the level of compliance. Such instructions may comprise mention of missing documents, software to be updated, access to files to be changed, physical changes to the physical IT infrastructure to be implemented, patches to be included. The system may automatically perform, upon validation by the team of experts, actions to improve the level of compliance according to at least part of the instructions (e.g., by executing a script, by applying a patch).

Finally, in the example, the method is then repeated a multitude of times, each time with updated documents. Between executions the IT infrastructure may be improved (e.g., automatically by the system, or by the team of experts by following instructions). The method is repeated till the team of experts is satisfied with the assessment. The team of experts may the ask the system to produce a document with the required legal and/or administrative format comprising the compliance assessment.

The method was implemented, and such implementations are now discussed.

The implementations were implemented to work with requirements in French, with documents in French, and the prompt of the respective LLMs were in French. Hereinbelow, it is provided English translations of such prompts and of the results. The LLMs used were based on llama architectures, notable llama 3.1 8B, and phi architectures, notably phi 3.5 and 4.

Large Language Models (LLMs) have evolved and improved in recent years, continuously pushing the boundaries of what was once considered impossible.

These developments reflect a broader trend towards more efficient and accessible LLMs, with companies employing techniques like "distillation" to create smaller, cost-effective models without significantly compromising performance. This approach allows for quicker and more economical development of AI applications, making advanced language models more accessible across various industries. Overall, the landscape of LLMs continues to advance rapidly, with a focus on enhancing multimodal capabilities, improving reasoning, and ensuring ethical use, thereby expanding their applicability across diverse sectors.

LLMs primarily rely on transformers. Transformer models have revolutionized natural language processing (NLP), leading to significant advancements in fields such as machine translation, text generation, and language comprehension. Models such as BERT (Bidirectional Encoder Representations from Transformers), GPT (Generative Pretrained Transformer), and their variants have pushed the boundaries of what transformers can achieve. For example, BERT is particularly effective for classification and text comprehension tasks, while GPT excels in text generation. Transformers use an architecture that employs attention mechanisms to process data sequences, making them more efficient at handling long-range dependencies than recurrent neural networks (RNNs) and long short-term memory networks (LSTMs).

The performance of LLMs is evaluated using various benchmarks (such as ChatBot Arena for chatbots, MMLU for comprehension, and ARC for reasoning), metrics, and rankings. Common benchmarks include tasks like text summarization, translation, and coding, with metrics such as accuracy, perplexity, and efficiency used to assess performance-such as comparing Gemini to ChatGPT. However, recent studies have highlighted deficiencies in these benchmarks, emphasizing the need for a paradigm shift and increased efforts to develop more universal benchmarks. Notably, current benchmarks lack document comparison capabilities, particularly in multiple languages, such as French (where English remains predominant). These still-imperfect benchmarks contribute to persistent challenges for LLMs, including hallucinations, inaccuracies in complex tasks, ethical considerations, explainability, energy consumption, fairness, and security.

Firstly, hallucinations in LLMs refer to cases where these models generate incorrect, irrelevant, or entirely fabricated information. This poses a major problem in critical applications such as medicine, finance, and cybersecurity. The causes are numerous, including imperfect training data. LLMs are trained on vast amounts of text, primarily sourced from the internet (mostly in English), which may contain incorrect, outdated, biased, or contradictory information. Issues such as noise, mis-association, or defective models that are insufficiently robust to mitigate hallucinations can arise. Additionally, LLMs generate text based on word sequence probabilities, leading to errors when extrapolating beyond their learned context. For tasks requiring deep contextual understanding in French, LLMs may struggle to produce accurate responses, particularly in fields requiring high precision, such as compliance, which involves complex and highly codified vocabulary.

Secondly, ensuring that models do not generate biased content is crucial. This involves integrating security mechanisms, conducting adversarial testing, and employing human oversight to review and guide AI responses. Ethical considerations are essential for responsible AI deployment, just as understanding why an LLM makes certain decisions is critical for building trust and preventing misuse. Today, "black-box reasoning" is a major challenge in the field. In our context, this aspect is significant—the LLM must not interchange standards or misinterpret provided responses.

Beyond data leaks or overreliance, LLMs present security risks, particularly as targets for attacks or adversarial inputs that mislead the model into generating incorrect or harmful responses. These attacks exploit inherent vulnerabilities in statistical models and can take the form of prompt injections, execution of malicious code, exploitation of server-side request forgery vulnerabilities, or training data poisoning. In our context, protecting the confidentiality of data used to train LLMs is crucial. Without proper safeguards, models could potentially memorize and disclose sensitive information.

Regarding accuracy and hallucination mitigation, solutions exist. Fine-tuning techniques (such as PEFT) and supervised learning allow models to be refined using specific, high-quality datasets. For instance, Google and OpenAI have leveraged specialized datasets to fine-tune their models for specific tasks and reduce errors. Contextual grounding provides additional context by integrating knowledge bases or reference documents during text generation, helping models produce more precise responses. Hybrid approaches incorporating human supervision involve feedback loops where experts verify and correct generated responses, enhancing accuracy. This method is particularly valuable in sensitive fields where precision is critical. Additionally, developing explainable AI (XAI) models enables users to understand why certain responses are generated, facilitating error detection and correction. However, fine-tuning and human supervision require significant resources in terms of time, cost, and data, making large-scale implementation challenging. Furthermore, transformers demand substantial computational power and memory resources despite ongoing advancements.

The training and deployment of large-scale models remain costly and energy-intensive. Research is underway to optimize model sizes (such as LoRA—Low-Rank Adaptation of Large Language Models) and reduce token usage to enhance performance, though a universal solution has yet to emerge. Even with controlled datasets and fine-tuning, models may retain biases present in their initial training data, leading to hallucinations or biased responses. Refining datasets, particularly concerning outdated information, has led to the development of Retrieval-Augmented Generation (RAG), allowing access to evolving databases. However, refinements are still needed for robustness, extension to multimodal models, and broader context integration. For highly complex tasks requiring deep contextual understanding—such as compliance documents with specific technical requirements—LLMs may still struggle. These models lack true comprehension or awareness, relying instead on statistical correlations that are still evolving and not yet adapted to our unique context spanning both civil and military domains.

Despite recent advances, the latest generations of LLMs do not yet perform as well as humans in complex comparative and synthesis tasks. Studies have identified inconsistencies, particularly for closely related data, leading to misleading and unreliable evaluations. Several factors contribute to this. For example, LLMs are constrained by the size of their context windows (typically handling between 4,096 and 1 million words), limiting their ability to accurately understand and compare large texts. This issue is exacerbated by the "Lost-in-the-Middle Problem," where crucial information becomes "buried" within a data stream, making it difficult for LLMs to retrieve. This is particularly relevant to compliance assessment, which involves voluminous compliance procedures using specific (e.g., in French) vocabulary and a specific structure that is difficult for a commercial LLM to grasp. Once again, context plays a crucial role in performance.

Technical solutions also exist to address LLM security and ethical challenges, such as content filtering (implementing filters to detect and block harmful content), developing robustness techniques to withstand adversarial attacks (e.g., adversarial training where the model is exposed to attack examples to learn how to counter them), and utilizing differential privacy techniques to ensure training data does not reveal sensitive information (these methods add noise to data to protect confidentiality while maintaining model performance). However, security solutions have significant limitations. Like human oversight mechanisms, content filters can be costly and complex, requiring considerable time and personnel resources. Moreover, content filters may be ineffective, blocking valid content or failing to detect subtle harmful content.

The future of generalized LLMs involves continuous improvements in security, scalability, and multimodal capabilities. Researchers are currently focused on reducing hallucinations, enhancing explainability, and ensuring ethical AI use. Furthermore, efforts are underway to make these powerful models more accessible and adaptable to industry-specific needs, enabling broader and more efficient applications. In summary, while the state-of-the-art LLMs—particularly American models—demonstrate impressive advancements with fine-tuning and RAG integration, critical questions remain regarding robustness and accuracy when training on precise sectoral data (e.g., in French) and accessing complex security policies and procedure documents. Addressing these challenges will be crucial for the continued evolution and responsible deployment of AI technology, for example, in the French industry.

The implementations reduce the duration of the whole certification process (i.e., the process comprising the obtaining of the one or more documents and the obtaining of the plurality of requirements) by around 50% by providing a conformity analysis for each user-defined requirement. Indeed, the process may be fully automatized after the obtaining steps. It thus makes it possible to conduct twice as much certification/compliance procedures and eases the integration of new collaborators.

Moreover, by homogenizing the compliance processes, the tool downsizes the human error factor and strengthens the security of the organizations and other stakeholders. Besides, security is all the more reinforced as the product provides recommendations for correcting cyber security vulnerabilities that can be automatically implemented if the user decides.

Finally, the implementations ensure the transition of organizations to cope with an exponentially growing workload to ensure comprehensive certification processes and to bring projects into compliance. To date, number of organizations are late in their mandatory procedures and are sometimes compelled to give up their projects.

The implementations may be used by Chief Information Security Officers in compliance/certification processes by smartly adapting the Retrieval Augmented Generation (RAG) architecture to the task. The features of the implementations comprise:

Documentary management: The implementations may store, display and index documents that are relative to the requirements and the company's project.

Information retrieval and sourcing: Using the implementations, a user can look for relevant information in the loaded documents and find from which paragraph of which document it comes from.

Conformity analysis: the implementations can evaluate the conformity of a given set of requirements according to what the project documents mention. It then generates a conformity matrix telling if a project is compliant, not compliant or partially compliant regarding each provided requirement along with a calculated trust score.

Compliance report generation: The implementations can automatically generate compliance reports in a user-specified format. The tool sums up all the information necessary to the compliance to the requirements in clear and concise reports using the results of the conformity analysis.

Document summary generation: The implementations may be used to generate summaries of documents.

AI assistant for document consultation: The implementations may comprise an AI-powered chatbot, that may be used to help the user interactively exploring the project documents. The user can ask specific questions to the chatbot that will provide them with a document-based answer. The chatbot then displays its sources for the user to check the documental basis of the answer.

Management of the access rights to the tool and to the loaded documents: The implementations may allow only some user to access critical information.

In the implementations, whenever a (e.g., project) document is loaded (at S20) on the system, a parser is used to transform the document into small chunks of text by cutting it up by pages. An additional step extracts the information from the many tables located in these documents. The tables are identified using the PDFPlumber library and are then given as input to a LLM (such as llama3.1 7B) in order to translate the structured data of the table in a semantic way in order to set up the semantic search to come.

A prompt that was used in the implementations for such an LLM can be translated into the following:

</begin_of_text/></start_header_id/>system</end_header_id/>

Here is a table in text form. Your task is to summarize the information in this table in a clear and concise paragraph. Your summary should include the most important and relevant details in the table, without omitting essential information. Make sure to capture the essence of the table and provide an accurate and complete summary of the data presented. Generate only the table summary, no additional context. If there is no table provided, generate exactly one word which is: "impossible".

Table: {table}

Second, each chunk of document is transform (at S30) into a vector of dimension 1024 (or embedding) using a fine-tuned embedding model (e.g., Solon). These vectors encode the information of every chunk in a geometric way.

By fine-tuning the embedding model to cyber security data, the embedding model obtained more knowledge on cybersecurity data and was therefore able to better capture technical field-specific nuances than the original embedding model, thus greatly improving the retriever performances.

The data used was generated by an LLM (such as llama3.1 7B) based on ANSSI standards scraped from the ANSSI website, along with open-source architecture documents (in French) available on Google.

The data used in the training phase, hence, comprised synthetic project data. The synthetic project data was based on a set of ANSSI requirements. An LLM was prompted to generate a project paragraph that satisfies the requirement (paragraph 1) and a project paragraph that does not satisfy the requirement (paragraph 2). These data were used to create the training set (90%) and the validation set (10%). The volume of such data was 2241+859 requirements accompanied by two generated paragraphs each. The generated project data and requirements may be used to refine the geometric encoding method of the information.

The data used further comprised synthetic norms. The synthetic norms were based on a set of paragraphs scraped from online project documents. An LLM was prompted to generate two requirements per paragraph. These data are used to create the test set. The volume of such data was 291 paragraphs including 2 generated requirements each.

The evaluation of the finetuning was performed using specific modules from the SentenceTransformers library called Evaluators. The embeddings were evaluated by assessing the quality of the information retrieval that could be reached using top-10 similarity search. The following metrics were used: MRR, Recall, and NDCG.

For hyperparameter tuning, the Optuna library was used. It enables Bayesian optimization, aiming to maximize an objective function (in this case, MRR@10 on the validation set provided by the Evaluator). This approach results in better computational efficiency compared to a grid search.

Multiple embedding models from the MTEB leaderboard were put to test and a selection of them was fine-tuned on the cyber-security data mentioned above.

The optimal parameter found for the use-case was a batch-size of 30 and a learning rate around $5.10^{-5}$.

The calculated vectors are stored in an SQLite database for accelerated lookups.

Once the vector database is set up, the retriever can be used to select (S50) the relevant paragraphs of the project documents to any given requirement. It uses a hybrid search to select a subset of 25 seemingly relevant chunks.

In one example of the implementations, two similarity scores out of the two embedding models (sparse and dense) for each chunk were computed. Such embeddings combine the two different rankings of the chunks using weighted Reciprocal Rank Fusion (RRF). Thus, the score of a chunk may be computed as:

$$\frac{\text{weight}_{dense}}{\text{rank}_{dense}(\text{chunk})} + \frac{\text{weight}_{sparse}}{\text{rank}_{sparse}(\text{chunk})}.$$

In another example of the implementations, two similarity searches are performed between the chunks and the requirement. The first one is calculated with the cosine similarity between the embedding of the chunks and the one of the requirement, both calculated with the fine-tuned embedding model (e.g., Solon). The second one uses the TF-IDF model of the scikit-learn library to capture syntax resemblance between the chunks and the requirement (common words or part of words).

The implementations further comprise an LLM reranker. The LLM reranker ranks the previously obtained 25 chunks in order of relevance to the requirement and selects up to five top chunks to feed to the LLM for compliance analysis. Using this architecture is often used in RAG retrievers and it comes from a fine equilibrium between speed of processing and precision.

The LLM reranker was fine-tuned. The dataset used for the fine-tuning was a set of more than 73000 questions and answer related to IT, and most of them to the cybersecurity. The training method used was Low Rank Adapters (LoRA) with a rank of 32. The training was effectuated on 4 GPUs and took 2 days.

Two examples of entries of the dataset are given:
1. Question: What is the NVLAP Specific Operations Checklist for Cryptographic Module Testing?
   Answer: It is a checklist that outlines specific requirements for Cryptographic Module Testing labs.
2. Question: Vulnerability Scanning, Demonstrating understanding of vulnerability scanning process. \n Can you help me understand the vulnerability scanning process?
   Answer: Sure, vulnerability scanning is the process of scanning a system or network to identify potential vulnerabilities. It involves using a scanner that searches for known vulnerabilities, missing patches, weak passwords, and other security issues. The scanner generates a report that provides details on the identified vulnerabilities and recommendations for remediation. Conducting regular vulnerability scanning is essential to maintaining a strong security posture.

A prompt that was used in the implementations for such a reranker LLM can be translated into the following:

</begin_of_text/></start_header_id/>system</end_header_id/>

You are an assistant for cybersecurity experts. Your first mission is to sort through documents. You should say whether the paragraph contains relevant information to assess the given requirement. </eot_id/></start_header_id/>user</end_header_id/>

Requirement: {requirement}

The paragraph: {paragraph}. Gives a score between 0 and </eot_id/></start_header_id/>assistant</end_header_id/>

Once the LLM has given scores to each chunk, the chunks are filtered. In the implementations, two filtering methods were used, a first based on a fixed threshold, and a second based on a dynamic threshold.

a) Filtering by Fixed Threshold:

Chunks having a score strictly lower than the threshold defined in the settings are removed from the collection. The collection is resorted in descending order of scores, and only the best n results (e.g., 5) are kept.

b) Filtering by Dynamic Threshold:

The idea of dynamic threshold filtering is to identify groups of chunks (clusters) based on the scores assigned to them, and to keep a certain number of the best clusters. To identify these clusters, Kernel Density Estimation (KDE) was used. The threshold depends on the number of wanted clusters. If no cluster is identified, a default_threshold parameter may be used as threshold.

The implementations used at S60 an assessing module A00 comprising the block A30 as previously described, comprising a first LLM A10 and a second LLM A20.

A prompt that was used in the implementations for the first LLM A10 can be translated into the following:

</system/>: You are an expert in the certification of French cybersecurity standards. Your task is Analyze documents against a specific cybersecurity requirement and then determine if that requirement is being met.

Assessment Guidelines:

1. Evaluate any compliant and non-compliant items.

2. Consider the intent of the requirement and the extent to which it is met.

3. Assess whether the identified gaps are significant enough to prevent overall compliance.

4. Consider ambiguities and grey areas in your final assessment.

Answer with a single word:

yes: The requirement is clearly met in its essential aspects.

No: Crucial elements of the requirement are clearly absent or not met.

partial: There is a significant mix of compliant and non-compliant elements, or there is insufficient information for a definitive conclusion.

unenforceable: The requirement does not apply to the document.

Here are some additional details to help you assess the requirement:

Yes:

Main criteria met: All essential aspects of the requirement are met.

Complete evidence: The documents or information provided clearly demonstrate compliance.

No missing items: All required items are present and correct.

No: It is obvious that the requirement is not met or no information regarding the requirement is present in the document.

partial:

Mixing of compliant and non-compliant elements: Some aspects are respected, others are not.

Incomplete or ambiguous evidence: The information provided does not allow a definitive conclusion.

Additional information needed: Additional data is required to assess full compliance.

inapplicable:

Requirement not relevant: The requirement does not apply to the context of the document being evaluated.

Poorly defined requirement: The requirement may be poorly worded or may not align with the objectives of the document.

No judgment possible: It is not possible to judge compliance because the requirement is not applicable.

Then, give a rationale for your answer.

Now it's up to you:

</end/></user/>:

Document:

{DAT}

Cybersecurity requirement to be assessed:

{requirement}

Your answer (one word) and the justification: </end/></assistant/>""""

A prompt that was used in the implementations for the first LLM A20 can be translated into the following:

</system/>: You are an expert in the certification of French cybersecurity standards. Your task is Analyze documents against a specific cybersecurity requirement and then determine whether that requirement is being met, taking a constructive and pragmatic approach.

Assessment Guidelines:

1. Evaluate any compliant and non-compliant items.

2. Ruling on compliance even with certain missing elements.

3. First identify the compliant elements, even partial ones.

4. Favor a favorable approach if the essential elements are present.

Answer with a Single Word:

yes: The requirement is clearly met in its essential aspects.

No: Crucial elements of the requirement are clearly absent or not met.

Here are some additional details to help you assess the requirement:

Yes:

Main criteria met: The essential aspects of the requirement are met, although some secondary points can be improved.

Sufficient evidence: The documents or information provided demonstrate compliance.

Progressive compliance: Measures are in place or planned to achieve full compliance.

No:

It is obvious that the requirement is not met or no information regarding the requirement is present in the document.

Favor "yes" in case of reasonable doubt if several elements of conformity are identifiable and similarly favor "no" if crucial elements of the requirement are clearly absent.

Then, give a rationale for your answer.

Now it's up to you:

</end/></user/>:

Document:

{DAT}

Cybersecurity Requirement to be Assessed:

{requirement}

Your answer (one word) and the justification: </end/></assistant/>

In some of the implementations, the assessing module A00 further comprised the third LLM A40 (LLM-as-a-

Judge). A prompt that was used in the implementations for the LLM A40 can be translated into the following:

</start_header_id/>system</end_header_id/>

You are an expert in the accreditation of French cyber-security standards. You will receive a couple of questions and answers plus context. Your task is to provide a "total score" indicating how well the answer addresses the concerns expressed in the question.

Give your answer as a float number on a scale of 0 to 10 where 0 means the answer is not useful at all and 10 means that the answer completely and usefully addresses the question.

Provide your feedback as follows:

Feedback:::

Total score: </eot_id/>

</start_header_id/>assistant</end_header_id/>

Both the first LLM A10 and second LLM A20 in the implementations outputted justifications for the compliance level. Such justifications were used for generating (at S70) a document data file. Moreover, some of the implementations further included an LLM (e.g., an LLM "thematic") designed to present a theme, a summary of the documents. A prompt that was used in the implementations for such an LLM can be translated into the following:

""""</user/>

Your goal is to analyze the documentation of an IS project and understand how it works specifically.

From the technical architecture document of this project, creates an answer synthesizing the different elements of the project that precisely answer the questions asked. Some questions are not explained in the document: in this case, answer that there is no information on the subject.

No generic knowledge should be integrated: your summaries should only be based on specific information from the project documentation.

The answer must be clear and precise; Including the specific entities named in the document. </eot_id/>

$Document:

*****

{DAT}

*****

Questions {questions}

Detailed answer: </end/>

</assistant/>"""""

Results obtained with one of the implementations described above are hereinbelow discussed. The results were obtained in French, using French requirement, documents, and prompts. As for the prompts, the English texts provided are translation in English from the original French texts.

The results are based on 6 requirements.

1. Title: Principles of architecture of the accommodation area.

Text: Generally speaking, the architecture of data center infrastructures is designed to meet all needs in terms of availability, confidentiality, traceability and integrity. The principle of defence in depth must be respected, in particular by the successive implementation of "demilitarised zones" (DMZs), security environments in hosting zones, dedicated virtual or physical machines, appropriate virtual local area networks (VLANs), strict filtering of application and administration flows.

2. Title: Integrate ISS clauses into IT development sub-contracts.

Text: When writing a development outsourcing agreement, several ISS clauses must be integrated: Mandatory developer training on secure development and classic vulnerabilities 3. Title: Preservation of logs.

Text: Security event logs must be kept for twelve rolling months, except for specific legal and regulatory constraints imposing specific retention periods.

4. Title: "Logging" alerts.

Text: Each system must have "logging" devices to keep track of security events. These traces must be stored in a secure manner.

5. Title: Define and implement a policy for managing and analyzing trace logs.

Text: A policy for managing and analyzing security event trace logs is defined by the CISO, validated by the compliance authority and implemented. The level of security of an information system depends largely on the ability of its operators and administrators to detect errors, malfunctions and attempts at illegal access to its components.

6. Title: Information protection.

Text: Internet access must pass through the entity's controlled gateways. As soon as sensitive information must pass through uncontrolled networks, it must be specifically protected by appropriate encryption.

The implementation assessed the following level of compliance:

1. Partially non-compliant.
2. Partially non-compliant.
3. Non-compliant.
4. Partially compliant.
5. Partially compliant.
6. Non-compliant.

The implementation outputted the following justifications/explanations:

1.

The requirement is partially compliant because:

The cybersecurity requirement is partially met in the document provided. Here are the elements that have been identified:

The proposed service levels for the MVP are defined and include availability, backup, and redundancy characteristics.

La Rochelle University's service tier is also defined and includes data availability, performance, and persistence characteristics.

Data traceability, platform supervision and technical administration are also defined and include elements such as authorization management, logging and GDPR rights management.

However, there are also elements that are not clearly defined or that are not respected:

Hosting and sizing of machines/services are not defined.

Network architecture is not defined.

The principle of defence in depth is not explicitly mentioned, although it is mentioned in the cybersecurity requirement.

Demilitarized zones (DMZs), hosted zone security environments, dedicated virtual or physical machines, appropriate virtual local area networks (VLANs), strict filtering of application flows, and administration are not explicitly mentioned.

As a result, the answer is "partial" as there is a mix of compliant and non-compliant elements, and additional information is needed to assess full compliance.

Orientation.

The guidance is non-compliant because:

The cybersecurity requirement requires the implementation of a principle of defense in depth, with demilitarized zones (DMZs), security environments, dedicated virtual or physical machines, appropriate virtual local area networks (VLANs), strict filtering of application and administrative flows.

In the document provided, there is no explicit mention of the implementation of these elements, including demilitarized zones (DMZs), security environments, dedicated virtual or physical machines, appropriate virtual local area networks (VLANs), strict filtering of application and administrative flows.

Although the document mentions elements such as platform monitoring, data traceability, authorization management, role management, technical and functional account management, etc., these elements do not meet the cybersecurity requirement requiring a principle of defense in depth.

Therefore, considering that the cybersecurity requirement is not met or that no information regarding the requirement is present in the document, the answer is "no".

2.

The requirement is partially compliant because:

The requirement for mandatory developer training on secure development and classic vulnerabilities is mentioned in the document, but it is not clear whether this requirement is fully met.

Indeed, the document mentions that "The technical choices are oriented towards: The REST protocol and so-called 'technical' APIs to promote interoperability," but it is not specified if the developers have received training on secure development and classic vulnerabilities.

In addition, the document mentions that "User authentication is performed through an access token created by the user and group management application," but it is not clear if this authentication is secure and if the developers have received training to implement it correctly.

Finally, the document mentions that "Access to the different types of data (dataset, database, files, etc.) are controlled," but it is not specified whether these controls are sufficient to ensure the security of the data.

As a result, it is difficult to conclude that the mandatory developer training requirement is fully met, and therefore it is necessary to obtain additional information to assess full compliance.

Orientation

The guidance is non-compliant because:

Even though the document mentions security elements such as the pooling of common features, the ability to integrate specific APIs, and the ability to get details of stored data models, there is no explicit mention of mandatory developer training on secure development and classic vulnerabilities. In addition, the ISS clauses are not explicitly mentioned in the development sub-contract.

3.

The system did not find any relevant documentation for this requirement.

4.

The requirement is partially compliant because:

The cybersecurity requirement requires that every system have "logging" devices to keep track of security events. These traces must be stored in a secure manner.

In the document, it is mentioned that:

Technical supervision includes a centralized logging brick for application events (section 10.1)

Logs related to user actions for web analytics will be managed by Matomo (section 7.2.5.2)

The management of system logs is described in the section "Technical representation-Infrastructure" (section 7.2.5.2)

However, it is unclear whether these logging devices are secure enough to keep records of security events in a safe manner. For example, it is not mentioned whether the logs are encrypted, whether access to the logs is controlled, etc.

Therefore, the answer is "partial" because there is a mixture of compliant and non-compliant elements, and it is necessary to have more information to assess full compliance.

Orientation

The orientation is in line because:

The documentation mentions the presence of "centralized logging of application events" (point 10.1 Supervision and Traceability) which makes it possible to keep a record of security events.

In addition, it is mentioned that logs related to user actions for web analysis will be managed by Matomo (point 7.2.5.2 Log storage).

Finally, the documentation mentions that the traces must be kept in a secure manner (Cybersecurity requirement to be evaluated).

This suggests that logging devices are present and that traces are kept securely, which meets the cybersecurity requirement.

5.

The requirement is partially compliant because:

The cybersecurity requirement requires that every system have "logging" devices to keep track of security events. These traces must be stored in a secure manner.

In the document, it is mentioned that:

Technical supervision includes a centralized logging brick for application events (section 10.1)

Logs related to user actions for web analytics will be managed by Matomo (section 7.2.5.2)

The management of system logs is described in the section "Technical representation-Infrastructure" (section 7.2.5.2)

However, it is unclear whether these logging devices are secure enough to keep records of security events in a safe manner. For example, it is not mentioned whether the logs are encrypted, whether access to the logs is controlled, etc.

Therefore, the answer is "partial" because there is a mixture of compliant and non-compliant elements, and it is necessary to have more information to assess full compliance.

Orientation

The orientation is in line because:

The documentation mentions the presence of "centralized logging of application events" (point 10.1 Supervision and Traceability) which makes it possible to keep a record of security events.

In addition, it is mentioned that logs related to user actions for web analysis will be managed by Matomo (point 7.2.5.2 Log storage).

Finally, the documentation mentions that the traces must be kept in a secure manner (Cybersecurity requirement to be evaluated).

This suggests that logging devices are present and that traces are kept securely, which meets the cybersecurity requirement.

6.

The system did not find any relevant documentation for this requirement.

The implementation further outputted, for the requirements 1., 2., 4., and 5. the sections used in the documents, and for each section, the relevant chunks for the assessment.

The implementation further outputted instructions to increase the level of compliance of the requirements. Moreover, for each instruction, the implementation indicates to which requirement the instructions are related to. The instructions comprise:

a. [Referring to requirements 4. and 5.] Identify secure storage (encryption, redundancy, production segregation) to ensure the safe retention of event logs.

b. [Referring to requirements 4. and 5.] Specify which accounts have log access rights.

c. [Referring to requirements 4. and 5.] Ensure that logs are not editable by administrators.

d. [Referring to requirements 3.] On secure storage, implement a 12-month rolling log retention.

e. [Referring to requirements 2.] Implement contractual clauses for IT contractors to facilitate training sessions on secure development and common vulnerabilities. This training must be maintained over time.

f. [Referring to requirements 1. and 6.] Check with the Cloud provider the partitioning of the different networks and their security levels. Servers must be protected from the internet by a DMZ g. [Referring to requirements 1, and 6.] Describe the means implemented by the Cloud provider in order to control the security of Internet access (DMZ, Reverse proxy, etc.) and the means of encrypting flows.

The method is computer-implemented. This means that steps (or substantially all the steps) of the method are executed by at least one computer, or any system alike. Thus, steps of the method are performed by the computer, possibly fully automatically, or, semi-automatically. In examples, the triggering of at least some of the steps of the method may be performed through user-computer interaction. The level of user-computer interaction required may depend on the level of automatism foreseen and put in balance with the need to implement user's wishes. In examples, this level may be user-defined and/or pre-defined.

Figure 6:
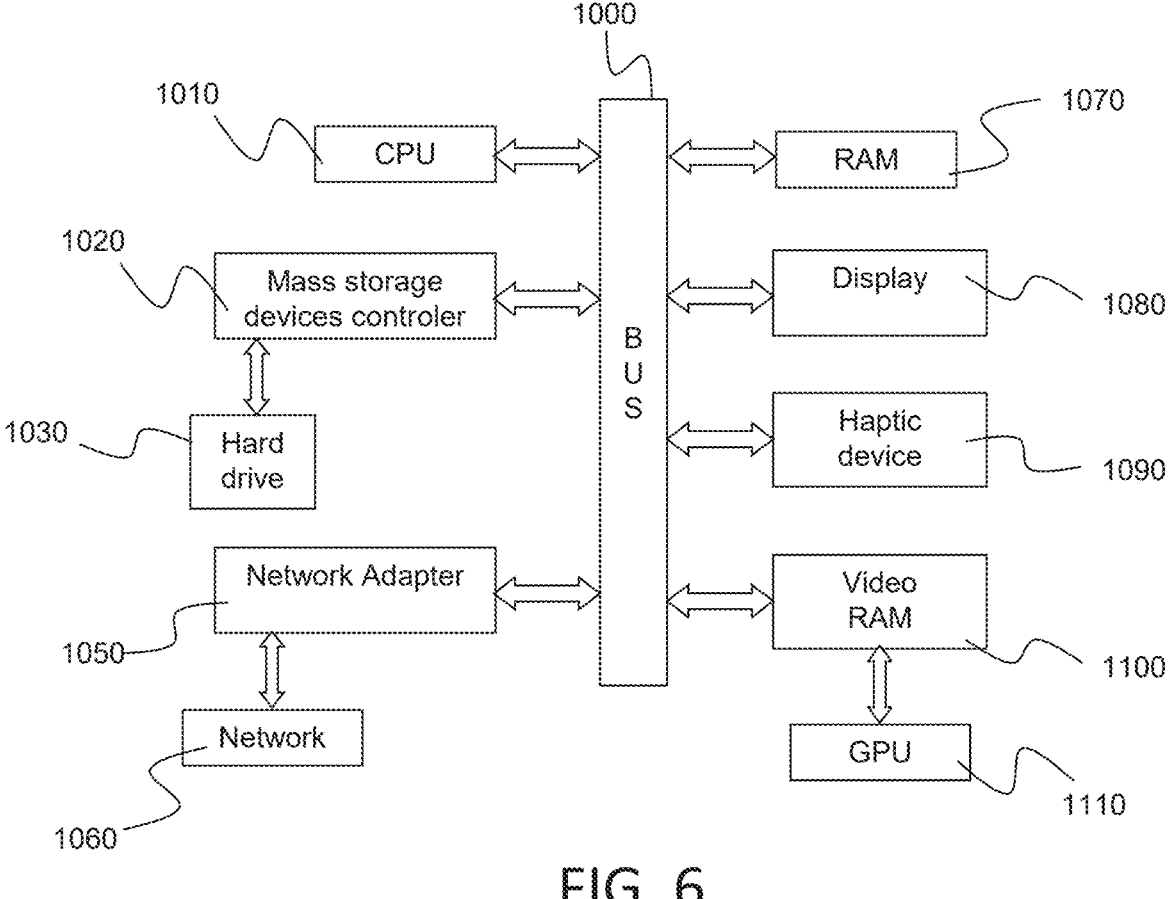
FIG. 6 shows an example of the system.
The foregoing will be apparent from the following more
particular description of example embodiments, as illus-
trated in the accompanying drawings in which like reference
characters refer to the same parts throughout the different
views. The drawings are not necessarily to scale, emphasis
instead being placed upon illustrating embodiments.

FIG. 6 shows an example of the system, wherein the system is a client computer system, e.g. a workstation of a user.

The client computer of the example comprises a central processing unit (CPU) 1010 connected to an internal communication BUS 1000, a random access memory (RAM) 1070 also connected to the BUS. The client computer is further provided with a graphical processing unit (GPU) 1110 which is associated with a video random access memory 1100 connected to the BUS. Video RAM 1100 is also known in the art as frame buffer. A mass storage device controller 1020 manages accesses to a mass memory device, such as hard drive 1030. Mass memory devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks;

magneto-optical disks. Any of the foregoing may be supplemented by, or incorporated in, specially designed ASICs (application-specific integrated circuits). A network adapter 1050 manages accesses to a network 1060. The client computer may also include a haptic device 1090 such as cursor control device, a keyboard or the like. A cursor control device is used in the client computer to permit the user to selectively position a cursor at any desired location on display 1080. In addition, the cursor control device allows the user to select various commands, and input control signals. The cursor control device includes a number of signal generation devices for input control signals to system. Typically, a cursor control device may be a mouse, the button of the mouse being used to generate the signals. Alternatively or additionally, the client computer system may comprise a sensitive pad, and/or a sensitive screen.

The computer program may comprise instructions executable by a computer, the instructions comprising means for causing the above system to perform the method. The program may be recordable on any data storage medium, including the memory of the system. The program may for example be implemented in digital electronic circuitry, or in computer hardware, firmware, software, or in combinations of them. The program may be implemented as an apparatus, for example a product tangibly embodied in a machine-readable storage device for execution by a programmable processor. Method steps may be performed by a programmable processor executing a program of instructions to perform functions of the method by operating on input data and generating output. The processor may thus be programmable and coupled to receive data and instructions from, and to transmit data and instructions to, a data storage system, at least one input device, and at least one output device. The application program may be implemented in a high-level procedural or object-oriented programming language, or in assembly or machine language if desired. In any case, the language may be a compiled or interpreted language. The program may be a full installation program or an update program. Application of the program on the system results in any case in instructions for performing the method. The computer program may alternatively be stored and executed on a server of a cloud computing environment, the server being in communication across a network with one or more clients. In such a case a processing unit executes the instructions comprised by the program, thereby causing the method to be performed on the cloud computing environment.

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. A computer-implemented method for cybersecurity compliance assessment, the method comprising:

obtaining one or more documents containing a description of an (Information Technology (IT) infrastructure, or of an organization or project relying on an IT infrastructure;

obtaining a plurality of requirements, including a set of cybersecurity requirements, each requirement including a text, the text of each obtained requirement containing one or more sentences;

determining, for each document of the obtained one or more documents, one or more respective document vectors, each respective document vector being a numerical vector representing a chunk of the document, thereby obtaining a plurality of document vectors each representing a respective chunk of a respective document, the determining of each respective document vector comprising:

determining a respective text representation of the respective chunk, the respective text representation of each chunk containing one or more sentences; and vectorizing the respective text representation of the respective chunk, the vectorizing comprising providing as input the respective text representation of the respective chunk to an embedding module, thereby obtaining as output the respective document vector, wherein the embedding module comprises a first embedding sub-module and a second embedding sub-module, and the embedding module is configured for taking a respective text containing one or more respective sentences as input and for:

by the first embedding sub-module, taking as input each sentence of the one or more respective sentences and determining an embedding vector representing the sentence, thereby obtaining a set of one or more embedding vectors, and by the second embedding sub-module, taking as input the set of one or more embedding vectors and combining the set of one or more embedding vectors into a single vector representing the respective text provided as input to the embedding module;

determining, for each requirement of the obtained plurality of requirements, a respective requirement vector, the respective requirement vector being a numerical vector representing the text of the requirement, the determining of the respective requirement vector comprising providing as input the text of the requirement to the embedding module, thereby obtaining as output the respective requirement vector;

selecting, for each requirement, one or more respective chunks each of a respective document, the selecting being based on a relevance of the document vectors with respect to the respective requirement vector;

assessing, for each requirement of the obtained plurality of requirements, a level of compliance of the description with the requirement, the assessing being based on the requirement and on the selected one or more respective chunks, the assessing being performed by an assessing module, the assessing module comprising a plurality of Large Language Models (LLMs) configured to cooperate for computing the level of compliance; and generating digital data that represents a result of the assessment.

2. The method of claim 1, wherein at least one chunk of at least one document contains at least one piece of non-textual data, and determining a respective text representation of the respective chunk comprises converting each piece of non-textual data of each chunk into a piece of textual data and including the piece of textual data in the respective text representation of the respective chunk, the converting comprising providing as input each piece of non-textual data to a converting module including a respective LLM.

3. The method of claim 1, wherein the first embedding sub-module comprises a trained embedding model with a transformer-based architecture, the trained embedding model having been trained on a training dataset comprising entries, each entry comprising a cybersecurity text.

4. The method of claim 1, wherein the selecting of the one or more respective chunks comprises, for each requirement:

computing a similarity score between each document vector and the respective requirement vector;

identifying a number of document vectors having a smallest distance with the respective requirement vector; and determining among the chunks corresponding to the identified number of document vectors the one or more respective chunks having a highest relevance with respect to the requirement.

5. The method of claim 4, wherein the determining among the chunks corresponding to the identified number of document vectors the one or more respective chunks is performed with a respective LLM, the respective LLM having been fine-tuned using cybersecurity text.

6. The method of claim 1, wherein the assessing module is configured for performing one or more executions of a block including:

a first LLM which provides as output a respective level of compliance among a set of values including "fully compliant", "partially compliant", and "non-compliant", and a second LLM configured to be executed when, and only when, the first LLM provides as output "partially compliant", the second LLM being configured to refine the respective level of compliance;

the level of compliance of the description with the requirement provided by the assessing module being based on the respective level of compliance outputted by each execution of the block.

7. The method of claim 6, wherein:

the assessing module is configured for further executing, after each respective execution of the block a third LLM, the third LLM being configured for taking as input the requirement, the selected one or more respective chunks, and the respective level of compliance outputted by the respective execution of the block, and providing as output a respective score of confidence indicating an exactness of the respective level of compliance outputted by the respective execution of the block;

the assessing module is configured for sequentially iterating executions of the block and of the third LLM until the respective score of confidence is higher than a predetermined threshold; and the level of compliance of the description with the requirement provided by the assessing module is based on the respective level of compliance outputted by a last execution of the block.

8. The method of claim 6, wherein:

the assessing module is configured for performing several executions of the block independently and in parallel; and the level of compliance of the description with the requirement provided by the assessing module is a most common level of compliance among the respective level of compliance outputted by each execution of the block.

9. The method of claim 1, wherein the digital data comprises a document data file.

10. The method of claim 1, wherein the method further comprises establishing a justification of the result of the assessment with a respective LLM.

11. The method of claim 1, wherein the digital data comprises, for at least one requirement, an instruction to increase the level of compliance.

12. The method of claim 11, wherein the method comprises establishing the instruction to increase the level of compliance with a respective LLM.

13. The method of claim 1, wherein the IT infrastructure is a real-world IT infrastructure, and the digital data comprise, for at least one requirement, configuration data to be deployed in the IT infrastructure to increase the level of compliance.

14. The method of claim 1, wherein the digital data comprises a graphical representation of the result, the method further comprises displaying the graphical representation on a display.

15. The method of claim 1, wherein the method further comprises creating a data management component comprising at least:

a requirement dataset comprising entries, each entry being indexed by a requirement, and comprising the text of the requirement;

a description dataset comprising entries, each entry being indexed by a chunk of one of the documents, and comprising the determined text representation of the chunk; and a vector dataset comprising requirement entries and description entries, each requirement entry comprising:
  a pointer to an entry of the requirement dataset; and
  a respective requirement vector having been determined from the requirement indexing the pointed entry;

each description entry comprising:
  a pointer to an entry of the description dataset; and
  a respective description vector having been determined from the description indexing the pointed entry.

16. A non-transitory computer readable medium having recorded thereon instructions configured for, when executed by one or more processors, causing performance of a method for cybersecurity compliance assessment, the method comprising:

obtaining one or more documents containing a description of an Information Technology (IT) infrastructure, or of an organization or project relying on an IT infrastructure;

obtaining a plurality of requirements, including a set of cybersecurity requirements, each requirement including a text, the text of each obtained requirement containing one or more sentences;

determining, for each document of the obtained one or more documents, one or more respective document vectors, each respective document vector being a numerical vector representing a chunk of the document, thereby obtaining a plurality of document vectors each representing a respective chunk of a respective document, the determining of each respective document vector comprising:

determining a respective text representation of the respective chunk, the respective text representation of each chunk containing one or more sentences; and vectorizing the respective text representation of the respective chunk, the vectorizing comprising providing as input the respective text representation of the respective chunk to an embedding module, thereby obtaining as output the respective document vector, wherein the embedding module comprises a first embedding sub-module and a second embedding sub-module, and the embedding module is configured for taking a respective text containing one or more respective sentences as input and for:

by the first embedding sub-module, taking as input each sentence of the one or more respective sentences and determining an embedding vector representing the sentence, thereby obtaining a set of one or more embedding vectors, and by the second embedding sub-module, taking as input the set of one or more embedding vectors and combining the set of one or more embedding vectors into a single vector representing the respective text provided as input to the embedding module;

determining, for each requirement of the obtained plurality of requirements, a respective requirement vector, the respective requirement vector being a numerical vector representing the text of the requirement, the determining of the respective requirement vector comprising providing as input the text of the requirement to the embedding module, thereby obtaining as output the respective requirement vector;

selecting, for each requirement, one or more respective chunks each of a respective document, the selecting being based on a relevance of the document vectors with respect to the respective requirement vector;

assessing, for each requirement of the obtained plurality of requirements, a level of compliance of the description with the requirement, the assessing being based on the requirement and on the selected one or more respective chunks, the assessing being performed by an assessing module, the assessing module comprising a plurality of Large Language Models (LLMs) configured to cooperate for computing the level of compliance; and generating digital data that represents a result of the assessment.

17. A computer system comprising one or more processors coupled to memory, the memory having recorded thereon instructions configured for, when executed by one or more processors, causing performance of a method for cybersecurity compliance assessment, the method comprising:

obtaining one or more documents containing a description of an Information Technology (IT) infrastructure, or of an organization or project relying on an IT infrastructure;

obtaining a plurality of requirements, including a set of cybersecurity requirements, each requirement including a text, the text of each obtained requirement containing one or more sentences;

determining, for each document of the obtained one or more documents, one or more respective document vectors, each respective document vector being a numerical vector representing a chunk of the document, thereby obtaining a plurality of document vectors each representing a respective chunk of a respective document, the determining of each respective document vector comprising:

determining a respective text representation of the respective chunk, the respective text representation of each chunk containing one or more sentences; and vectorizing the respective text representation of the respective chunk, the vectorizing comprising providing as input the respective text representation of the respective chunk to an embedding module, thereby obtaining as output the respective document vector, wherein the embedding module comprises a first embedding sub-module and a second embedding sub-module, and the embedding module is configured for taking a respective text containing one or more respective sentences as input and for:

by the first embedding sub-module, taking as input each sentence of the one or more respective sentences and determining an embedding vector representing the sentence, thereby obtaining a set of one or more embedding vectors, and by the second embedding sub-module, taking as input the set of one or more embedding vectors and combining the set of one or more embedding vectors into a single vector representing the respective text provided as input to the embedding module;

determining, for each requirement of the obtained plurality of requirements, a respective requirement vector, the respective requirement vector being a numerical vector representing the text of the requirement, the determining of the respective requirement vector comprising providing as input the text of the requirement to the embedding module, thereby obtaining as output the respective requirement vector;

selecting, for each requirement, one or more respective chunks each of a respective document, the selecting being based on a relevance of the document vectors with respect to the respective requirement vector;

assessing, for each requirement of the obtained plurality of requirements, a level of compliance of the description with the requirement, the assessing being based on the requirement and on the selected one or more respective chunks, the assessing being performed by an assessing module, the assessing module comprising a plurality of Large Language Models (LLMs) configured to cooperate for computing the level of compliance; and generating digital data that represents a result of the assessment.

\* \* \* \* \*